United States Patent [19]

Lubowitz et al.

[11] Patent Number: 5,109,105
[45] Date of Patent: Apr. 28, 1992

[54] POLYAMIDE OLIGOMERS

[75] Inventors: Hyman R. Lubowitz, Rolling Hills Estates, Calif.; Clyde H. Sheppard, Bellevue, Wash.

[73] Assignee: The Boeing Company, Seattle, Wash.

[21] Appl. No.: 366,723

[22] Filed: Jun. 7, 1989

Related U.S. Application Data

[60] Division of Ser. No. 61,938, Jun. 12, 1987, Pat. No. 4,876,328, which is a continuation-in-part of Ser. No. 865,228, May 20, 1986, abandoned, which is a continuation-in-part of Ser. No. 781,847, Sep. 30, 1985, abandoned, and a continuation-in-part of Ser. No. 51,884, May 18, 1987, Pat. No. 4,847,333.

[51] Int. Cl.⁵ .................. C08G 69/26; C08F 22/40; C08F 26/06
[52] U.S. Cl. .................. 528/322; 528/125; 528/129; 528/170; 528/172; 528/173; 528/310; 528/331; 528/332; 528/336; 528/345; 528/348; 528/353
[58] Field of Search ............ 526/262; 528/322, 125, 528/129, 170, 172, 173, 310, 332, 331, 336, 345, 348, 353

[56] References Cited

U.S. PATENT DOCUMENTS

| | | | |
|---|---|---|---|
| 3,105,839 | 10/1963 | Renner | 528/361 |
| 3,528,950 | 9/1970 | Lubowitz | 528/229 |
| 3,689,464 | 9/1972 | Holub et al. | 528/322 |
| 3,781,249 | 12/1973 | Lubowitz | 528/350 |
| 3,839,287 | 10/1974 | Kwiatkowski et al. | 528/172 |
| 4,110,188 | 8/1978 | Darms et al. | 528/322 |
| 4,234,712 | 11/1980 | Keller et al. | 528/9 |
| 4,251,418 | 2/1981 | Chow et al. | 524/104 |
| 4,266,047 | 5/1981 | Jablonski et al. | 528/322 |
| 4,365,068 | 12/1982 | Darms et al. | 548/435 |
| 4,556,697 | 12/1985 | Curatolo et al. | 525/434 |
| 4,604,437 | 8/1986 | Renner | 528/322 |
| 4,739,030 | 4/1988 | Lubowitz et al. | 548/435 |
| 4,739,075 | 4/1988 | Odagiri et al. | 548/431 |
| 4,847,333 | 7/1989 | Lubowitz et al. | 528/432 |
| 4,851,495 | 7/1989 | Sheppard et al. | 528/170 |
| 4,851,501 | 7/1989 | Lubowitz et al. | 528/170 |
| 4,868,270 | 9/1989 | Lubowitz et al. | 528/170 |
| 4,876,328 | 10/1989 | Lubowitz et al. | 528/322 |

Primary Examiner—John Kight, III
Assistant Examiner—P. Hampton-Hightower
Attorney, Agent, or Firm—Senniger, Powers, Leavitt & Roedel

[57] ABSTRACT

Polyamide advanced composites are formed by the condensation of diacid halides (or dicarboxylic acids) and diamines in a linear or multidimensional morphology with crosslinkable end caps that provide improved solvent-resistance. The diamines and diacid halides generally include "sulfone" linkages in aryl chains to impart the desired combination of physical properties to the oligomers, prepregs, and composites. Linear oligomers have mono- or difunctional crosslinking end caps at the ends of polyarylamide chains. Multidimensional oligomers have a hub and three or more radiating amide arms, each arm having a mono- or difunctional crosslinking end cap at its distal end.

26 Claims, No Drawings

POLYAMIDE OLIGOMERS

REFERENCE TO RELATED APPLICATIONS

This application is a divisional application based upon U.S. patent application Ser. No. 07/061,938, filed Jun. 12, 1987 now U.S. Pat. No. 4,876,328, which is a continuation-in-part application based upon U.S. Ser. No. 865,228, filed May 20, 1986 now abandoned, which was a continuation-in-part based upon U.S. Ser. No. 781,847, filed Sep. 30, 1985, now abandoned, and is a continuation-in-part of U.S. Ser. No. 051,884 filed May 18, 1987 now U.S. Pat. No. 4,847,333 for "Blended Polyamide Oligomers."

TECHNICAL FIELD

The present invention relate to polyamide oligomers that are solvent resistant, thermally stable, and easily processible into prepregs and composites. The resulting composites are useful for aerospace applications.

BACKGROUND OF THE INVENTION

Recently, chemists have sought to synthesize oligomers for high performance advanced composites suitable for aerospace applications. These composites should exhibit solvent resistance, toughness, impact resistance, processibility, and strength, and should be thermoplastic. Oligomers and composites that have thermo-oxidative stability, and, accordingly can be used at elevated temperatures are particularly desirable.

While epoxy-based composites are suitable for many applications, their brittle nature and susceptibility to degradation make them inadequate for many aerospace applications, especially those applications which require thermally stable, tough composites. Accordingly, research has recently focused on polyimide composites to achieve an acceptable balance between thermal stability, solvent resistance, and toughness. Still the maximum temperatures for use of the polyimide composites, such as PMR-15, are about 600°-625° F., since they have glass transition temperatures of about 690° F.

There has been a progression of polyimide sulfone compounds synthesized to provide unique properties or combinations of properties. For example, Kwiatkowski and Brode synthesized maleic capped linear polyarylimides as disclosed in U.S. Pat. No. 3,839,287. Holub and Evans synthesized maleic or nadic capped imido-substituted polyester compositions as disclosed in U.S. Pat. No. 3,729,446. We synthesized thermally stable polysulfone oligomers as disclosed in U.S. Pat. No. 4,476,184 or U.S. Pat. No. 4,536,559, and have continued to make advances with polyetherimidesulfones, polybenzoxazolesulfones, polybutadienesulfones, and "star" or "star-burst" multidimensional oligomers. We have shown surprisingly high glass transition temperatures yet reasonable processibility and desirable physical properties in many of these oligomers and their composites.

Polybenzoxazoles, such as those disclosed in our copending applications U.S. Ser. No. 06/816,490 filed Jan. 6, 1986 now abandoned (to Lubowitz & Sheppard) and Ser. No. 06/893,124 filed Aug. 4, 1986 (to Lubowitz, Sheppard, and Stephenson), may be used at temperatures up to about 750°-775° F., since these composites have glass transition temperatures of about 840° F. Some aerospace applications need composites which have even higher use temperatures while maintaining toughness, solvent resistance, processibility, formability, strength, and impact resistance.

Multidimensional oligomers, such as disclosed in our copending applications U.S. Ser. Nos. 06/726,258 filed Apr. 23, 1985 abandoned; 06/810,817 filed Dec. 17, 1985 abandoned; and 07/000,605, filed Jan. 5, 1987, have superior processibility over some advanced composite oligomers since they can be handled at lower temperatures. Upon curing, however, the phenylimide end caps crosslink so that the thermal resistance of the resulting composite is markedly increased with only a minor loss of stiffness, matrix stress transfer (impact resistance), toughness, elasticity, and other mechanical properties. Glass transition temperatures above 950° F. are achievable.

Commercial polyesters, when combined with well-known diluents, such as styrene, do not exhibit satisfactory thermal and oxidative resistance to be useful for aircraft or aerospace applications. Polyarylesters are often unsatisfactory, also, since the resins often are semicrystalline which may makes them insoluble in laminating solvents, intractable in fusion, and subject to shrinking or warping during composite fabrication. Those polyarylesters that are soluble in conventional laminating solvents remain so in composite form, thereby limiting their usefulness in structural composites. The high concentration of ester groups contributes to resin strength and tenacity, but also makes the resin susceptible to the damaging effects of water absorption. High moisture absorption by commercial polyesters can lead to distortion of the composite when it is loaded at elevated temperature.

High performance, aerospace, polyester advanced composites, however, can be prepared using crosslinkable, end capped polyester imide ether sulfone oligomers that have an acceptable combination of solvent resistance, toughness, impact resistance, strength, processibility, formability, and thermal resistance. By including Schiff base (—CH=N—), imidazole, thiazole, or oxazole linkages in the oligomer chain, the linear, advanced composites formed with polyester oligomers of our copending application U.S. Ser. No. 06/726,259 filed Apr. 23, 1985 now abandoned, can have semiconductive or conductive properties when appropriately doped.

Conductive and semiconductive plastics have been extensively studied (see, e.g., U.S. Pat. Nos. 4,375,427; 4,338,222; 3,966,987; 4,344,869; and 4,344,870), but these polymers do not possess the blend of properties which are essential for aerospace applications. That is, the conductive polymers do not possess the blend of (1) toughness, (2) stiffness, (3) elasticity, (4) processibility, (5) impact resistance (and other matrix stress transfer capabilities), (6) retention of properties over a broad range of temperatures, and (7) high temperature resistance that is desirable on aerospace advanced composites. The prior art composites are often too brittle.

Thermally stable multidimensional oligomers having semiconductive or conductive properties when doped with suitable dopants are also known and are described in our copending applications (including U.S. Ser. No. 06/773,381 filed Sep. 5, 1985, now abandoned to Lubowitz, Sheppard and Torre). The linear arms of the oligomers contain conductive linkages, such as Schiff base (—N=CH—) linkages, between aromatic groups. Sulfone and ether linkages are interspersed in the arms. Each arm is terminated with a mono- or difunctional end cap to allow controlled crosslinking upon heat-induced or chemically-induced curing.

SUMMARY OF THE INVENTION

Solvent resistant polyamide (—CONH—) oligomers suitable for aerospace applications are formed by reacting suitable "sulfone" diacid halides with diamines (particularly sulfone diamines) and crosslinking end cap phenylimides. In preferred oligomers, the acid halides (or acids) and diamines are aromatic or are polyaryl with "sulfone" linkages, such as a compound selected from the group consisting of:

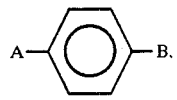

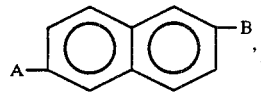

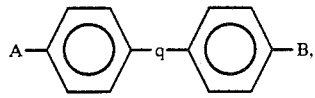

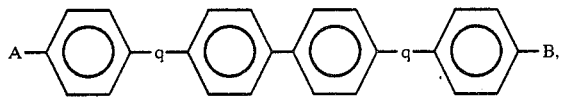

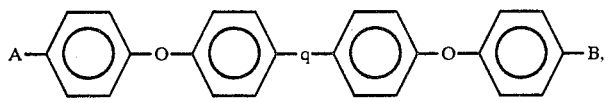

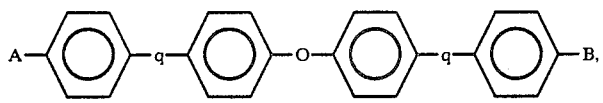

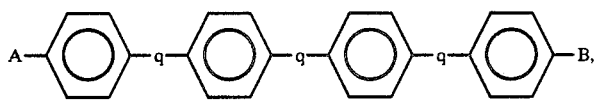

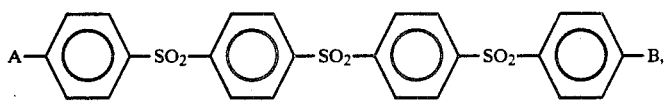

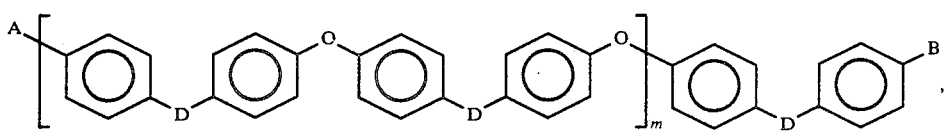

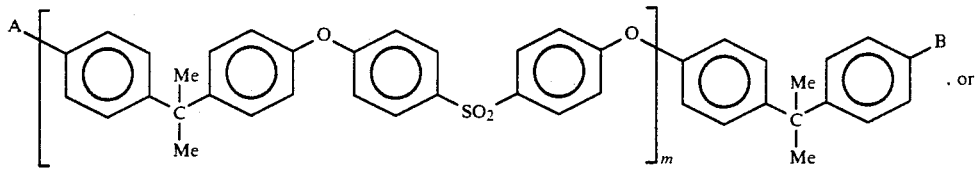, or

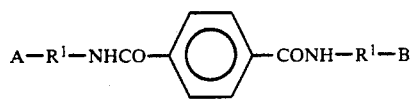

wherein
- q = —SO$_2$—, —CO—, —S—, or —(CF$_3$)$_2$C—, and preferably —SO$_2$— or —CO—;
- Me = methyl;
- m = an integer, generally less than 5, and preferably 0 or 1;
- D = any of —CO—, —SO$_2$—, or —(CF$_3$)$_2$C—;
- A = —NH$_2$ or —COX;
- B = —NH$_2$ if A = —NH$_2$, and —COX, if A = —COX;
- X = halogen; and
- R$^1$ = a C$_2$ to C$_{12}$ divalent aliphatic, alicyclic, or aromatic radical.

These reactants are mixed and reacted under an inert atmosphere with suitable crosslinking end caps selected from the group consisting of:

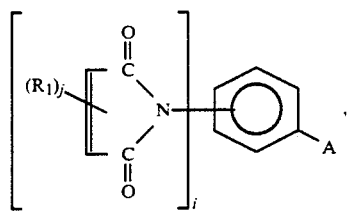

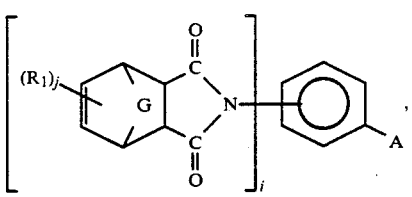

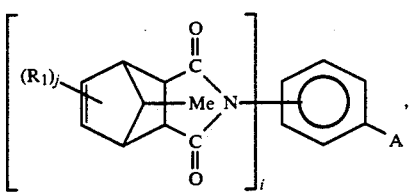

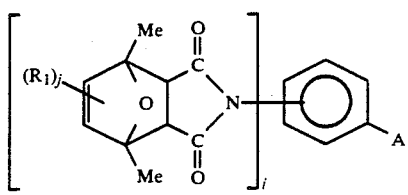

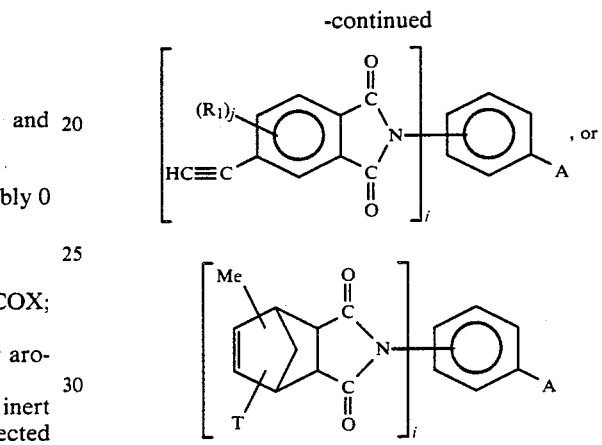

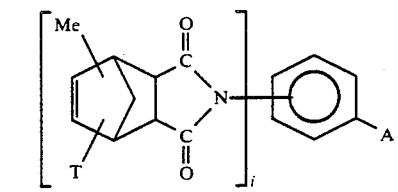

wherein
- A = —NH$_2$ or —COX,
- R$_1$ = lower alkyl, lower alkoxy, aryl, aryloxy, substituted alkyl, substituted aryl (including hydroxyl or halo-substituents), halogen, or mixtures thereof;
- j = 0, 1, or 2;
- i = 1 or 2;
- G = —CH$_2$—, —O—, —S—, or —SO$_2$—;
- T = allyl or methallyl; and
- Me = methyl.

The selection of a suitable end cap (E) usually is made on the basis of thermal stability and thermal activation of the end cap so that the resin will soften near the activation temperature.

Accordingly, the linear (i.e. two-dimensional) polyamide oligomers produced by the condensation of the end cap monomers, diacid halides, and diamines have the general formulae:

E—CONH—P—NHCO$\{$Q—CONH—P—NHCO$\}_m$E

E—NHCO—Q—CONH$\{$P—NHCO—Q—CONH$\}_m$E wherein
- m = a small integer;
- E = a residue of a crosslinkable end cap to improve the solvent resistance of the cured oligomer in the advanced composite; and
- P and Q = linear residues (i.e., divalent radicals) of the respective diamines (P) and diacid halides (Q), and preferably are polyaryl "sulfone" radicals.

Semiconductive or conductive polyamide advanced composites can be made if either or both of the diamines and diacid halides include conductive linkages. Preferred Schiff base divalent radicals for this purpose have the general formula:

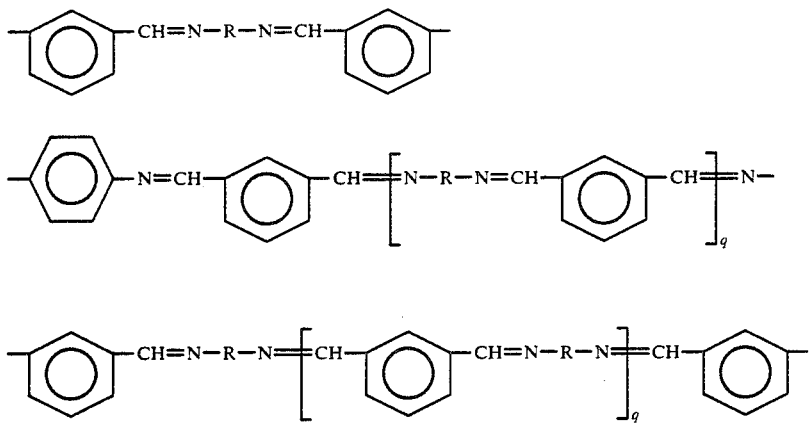

wherein
R = an aromatic moiety or a short aryl chain including a plurality of aryl moieties linked with any of —CH$_2$—, —SO$_2$—, —S—, —O—, —CO—, —(CH$_3$)$_2$C—, or —(CF$_3$)$_2$C—; and
q = 0–4.

Oxazole, thiazole, imidazole, or other electronegative linkages might be included in the oligomers to achieve semiconductive or conductive composites when suitably doped.

Resins exhibiting a multidimensional morphology are also synthesized with the inclusion of a suitable hub for the radiating arms. These "star" or "star-burst" oligomers have a central, aromatic hub and radiating arms to make the oligomers 3-dimensional in their crosslinking patterns, since each arm includes a terminal end cap with one or two crosslinking functionalities. The hub is represented by the structure

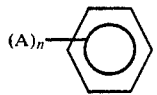

wherein A = —NO$_2$, —NH$_2$, or —COX and n = 3 or 4. Condensed with suitable diamines, diacid halides, and end caps, the hub forms the center of oligomers having the general formulae:

Ar—[CONH—P—NHCO—Q—CONH—E]$_n$;

Ar—[NHCO—Q—CONH—P—NHCO—E]$_n$;

Ar—[CONH—E]$_n$;

Ar—[NHCO—E]$_n$;

Ar—[CONH—P—NHCO—E]$_n$; or

Ar—[NHCO—Q—CONH—E]$_n$, wherein Ar = an aromatic moiety (preferably phenyl, biphenyl, or naphthyl) that represents the hub; and n, P, Q, and E are as previously defined. As with the linear oligomers, conductive or semiconductive composites of the multidimensional morphology can be made by including conductive linkages in the arms and doping the composite accordingly.

Prepregs and cured composites can be readily prepared from the oligomers by conventional techniques.

For example, the oligomers can be applied to a compatible fiber cloth reinforcement, and the resulting prepreg can be cured in a vacuum bag process to form solvent-resistant advanced composites useful in aerospace applications.

Imidophenylamine end cap monomers of the general formula:

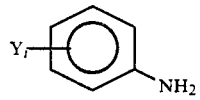

wherein
Y =

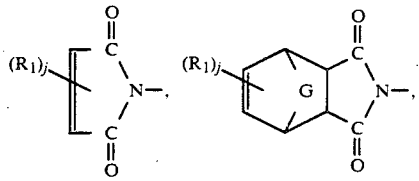

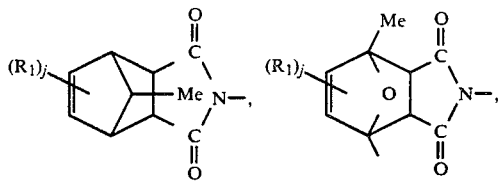

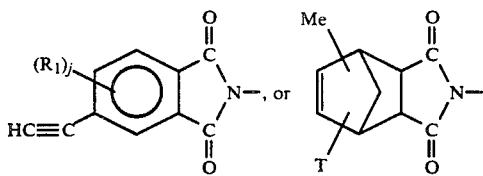

R$_1$ = lower alkyl, lower alkoxy, aryl, aryloxy, substituted alkyl, substituted aryl (either including hydroxyl or halo-substituents), halogen, or mixtures thereof;
i = 1 or 2;
j = 0, 1, or 2;
G = —CH$_2$—, —O—, —S—, or —SO$_2$—;

T=methallyl or allyl; and
Me=methyl,
are novel compositions of matter prepared by the steps of reacting the respective acid halide end cap with ammonia to form an acid amide, and rearranging the acid amide to the amine.

BEST MODE CONTEMPLATED FOR THE INVENTION

Solvent resistant, linear or multidimensional polyamide (—CONH—) oligomers suitable for aerospace applications are prepared by the condensation of diacid halides (or acids) with diamines and suitable crosslinking end caps. Preferred oligomers are selected from the group consisting of:

E—CONH—P—NHCO₊Q—CONH—P—NH-CO)ₘE

E—NHCO—Q—CONH₊P—NH-CO—Q—CONH)ₘE

Ar₊CONH—P—NHCO—Q—CONH—E]ₙ

Ar₊NHCO—Q—CONH—P—NHCO—E]ₙ wherein
m=a small integer generally less than 5, and preferably 0, 1, or 2;
Ar=an aromatic moiety;
n=3 or 4;
E=a crosslinkable end cap to improve the solvent resistance of the cured oligomer in the advanced composite; and
P=a linear residue of the diamine, and, preferably, a polyaryl "sulfone" residues; and
Q=a linear residue of the diacid halide (or acid), and, preferably, a polyaryl "sulfone" residue.

The diacid halide (or dicarboxylic acid, if desired) may include an aromatic chain segment selected from the group consisting of:
phenyl; naphthyl; biphenyl;
a polyaryl "sulfone" divalent radical of the general formula:

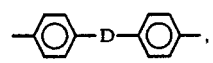,

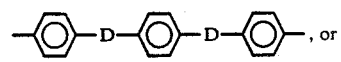, or

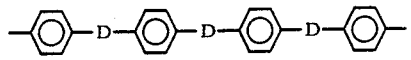

wherein D=—S—, —O—, —CO—, —SO₂—, —(CH₃)₂C—, —(CF₃)₂C—, or mixtures thereof throughout the chain;

a divalent radical having conductive linkages, illustrated by Schiff base compounds selected from the group consisting of:

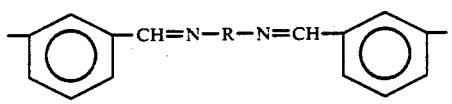

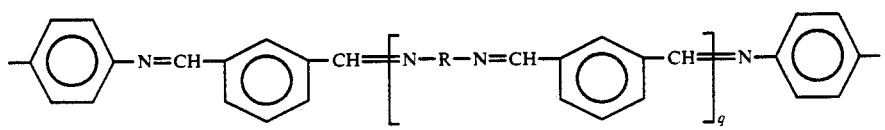

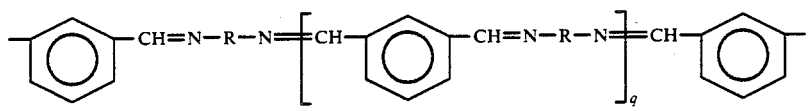

wherein R is selected from the group consisting of: phenyl; biphenyl; naphthyl; or a divalent radical of the general formula:

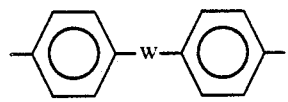

wherein W=—SO₂— or —CH₂—; and q=0-4; or a divalent radical of the general formula:

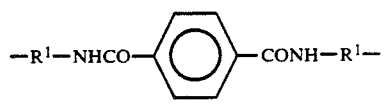

wherein R¹=a C₂ to C₁₂ divalent aliphatic alicyclic, or aromatic radical, and, preferably, phenyl (as described in U.S. Pat. No. 4,556,697).

Thiazole, oxazole, or imidazole linkages, especially between aryl groups, may also be used in the conductive or semiconductive oligomers.

The preferred diacid halides include:

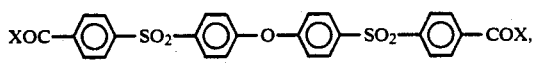

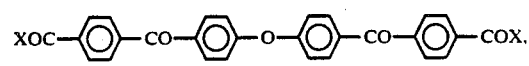

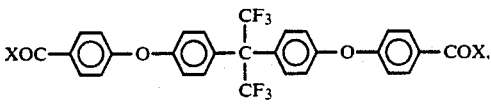

-continued

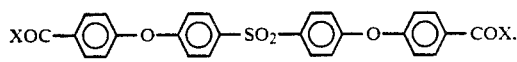

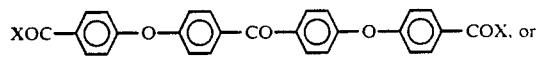

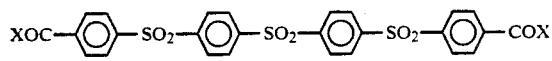

Schiff base acid halides can be prepared by the condensation of aldehydes and amines in the general reaction scheme:

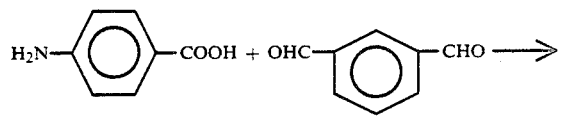

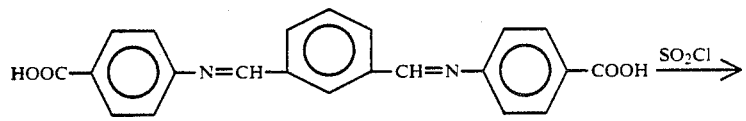

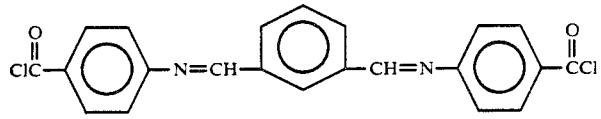

or similar schemes.

Other diacid halides that can be used, but that are not preferred, are disclosed in U.S. Pat. No. 4,504,632, and include:

adipylchloride,
malonyl chloride,
succinyl chloride,
glutaryl chloride,
pimelic acid dichloride,
suberic acid dichloride,
azelaic acid dichloride,
sebacic acid dichloride,
dodecandioic acid dichloride,
phthaloyl chloride,
isophthaloyl chloride,
terephthaloyl chloride,
1,4-naphthalene dicarboxylic acid dichloride, and
4,4'-diphenylether dicarboxylic acid dichloride.

Polyaryl or aryl diacid halides are preferred to achieve the highest thermal stabilities in the resulting oligomers and composites insofar as aliphatic bonds are not as thermally stable as aromatic bonds. Particularly preferred compounds include intermediate "sulfone" linkages to improve toughness of the resulting oligomers. For purposes of this description, "sulfone" linkages include —SO$_2$—, —S—, —CO—, and —(CF$_3$)$_2$C—, unless clearly limited to only —SO$_2$—.

Preferred diamines are selected from the group consisting of:

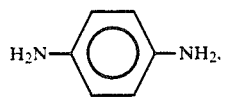

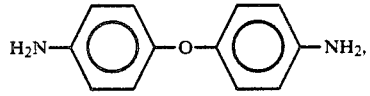

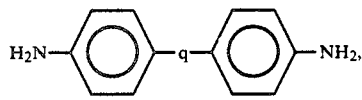

-continued
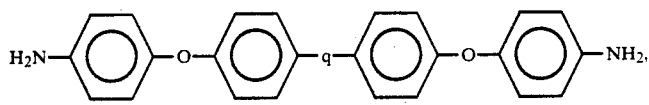
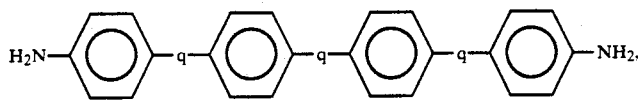
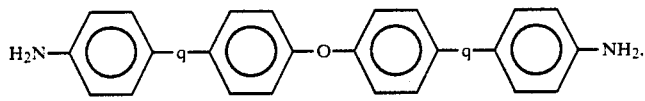
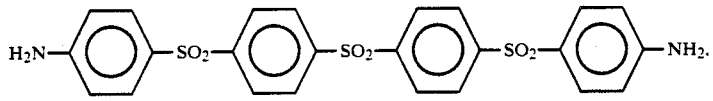
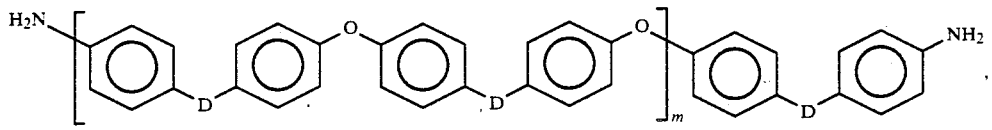
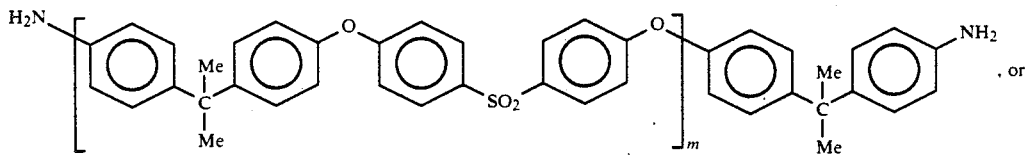, or
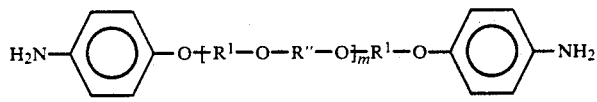
wherein
R$^1$=
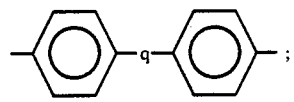;
R″=
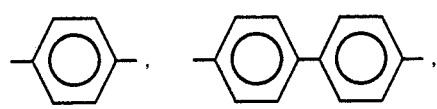,
-continued
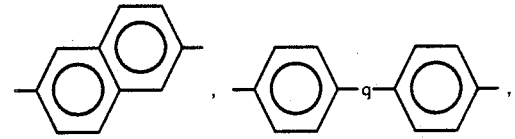,
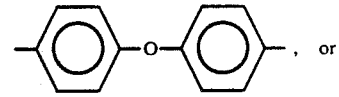, or
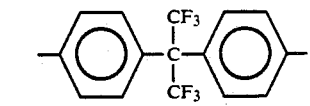
q=—SO$_2$—, —CO—, —S—, or —(CF$_3$)$_2$C—, and preferably —SO$_2$— or —CO—;

Me=methyl;
m=an integer, generally less than 5, and preferably 0, 1, or 2;
D=any of —CO—, —SO₂—, or —(CF₃)₂C—; and
X=halogen.

Diamines comparable to the diacid halides previously described and including "Schiff base" conductive linkages (particularly —N=CH—) are also contemplated as suitable diamines.

Other diamines that may be use, but that are not preferred, include those described in U.S. Pat. Nos. 4,504,632; 4,058,505; 4,576,857; 4,251,417; and 4,215,418. The aryl or polyaryl "sulfone" diamines previously described are preferred, since these diamines are soluble in conventional synthetic solvents and provide high thermal stability to the resulting oligomers and composites.

Particularly preferred ethersulfone (i.e. phenoxyphenyl sulfone) diamines are those in which $R_1$ is

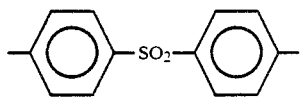

and R'' is

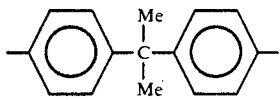

so that the phenoxyphenyl sulfone diamines include:

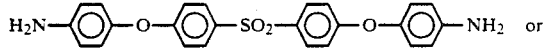

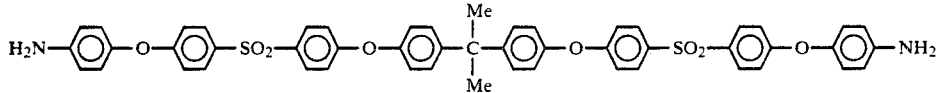

The molecular weights of these diamines can be easily varied from approximately 500 to about 2000. Using lower molecular weight diamines enhances the mechanical properties of the difunctional polyimide oligomers, each of which has alternating ether "sulfone" segments in the backbone.

Phenoxyphenyl sulfone diamines of this general nature can be prepared by reacting two moles of aminophenol with (n+1) moles of an aryl radical having terminal, reactive halide functional groups (dihalogens), such as 4,4'-dichlorodiphenyl sulfone, and a suitable bisphenol (i.e., dihydric phenol or diol). The bisphenol is preferably selected from the group consisting of:

2,2-bis-(4-hydroxyphenyl)-propane (i.e., bisphenol-A);
bis-(2-hydroxyphenyl)-methane;
bis-(4-hydroxyphenyl)-methane;
1,1-bis-(4-hydroxyphenyl)-ethane;
1,2-bis-(4-hydroxyphenyl)-ethane;
1,1-bis-(3-chloro-4-hydroxyphenyl)-ethane;
1,1-bis-(3,5-dimethyl-4-hydroxyphenyl)-ethane;
2,2-bis-(3-phenyl-4-hydroxyphenyl)-propane;
2,2-bis-(4-hydroxynaphthyl)-propane
2,2-bis-(4-hydroxyphenyl)-pentane;
2,2-bis-(4-hydroxyphenyl)-hexane;
bis-(4-hydroxyphenyl)-phenylmethane;
bis-(4-hydroxyphenyl)-cyclohexylmethane;
1,2-bis-(4-hydroxyphenyl)-1,2-bis-(phenyl)-ethane;
2,2-bis-(4-hydroxyphenyl)-1-phenylpropane;
bis-(3-nitro-4-hydrophenyl)-methane;
bis-(4-hydroxy-2,6-dimethyl-3-methoxyphenyl)-methane;
2,2-bis-(3,5-dichloro-4-hydroxyphenyl)-propane;
2,2-bis-(3-bromo-4-hydroxyphenyl)-propane;

or mixtures thereof, as disclosed in U.S. Pat. No. 3,262,914. Bisphenols having aromatic character (i.e., absence of aliphatic segments), such as bisphenol A, are preferred.

The dihalogens in this circumstance preferably are selected from the group consisting of:

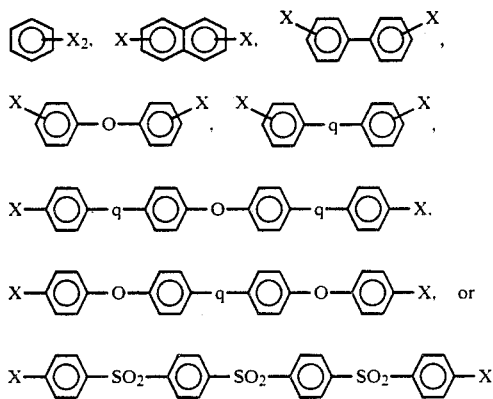

wherein
X=halogen, preferably chlorine; and
q=—S—, —SO₂—, —CO—, —(CH₃)₂C—, and —(CF₃)₂C—, and preferably either —SO₂— or —CO—.

The condensation reaction creates ether diamines that ordinarily include intermediate "sulfone" linkages. The condensation generally occurs through a phenate mechanism in the presence of $K_2CO_3$ or another base in a DMSO/toluene solvent. Additional methods for preparing phenoxyphenysulfones of this general type are disclosed in U.S. Pat. Nos. 3,839,287 and 3,988,374.

Although the goal is advanced composites with high thermal stabilities, a wide variety of composites with different temperature use ranges can be made, and are all considered to be within the class of compounds contemplated by this invention. To that end, the end caps may be selected from the group consisting of:

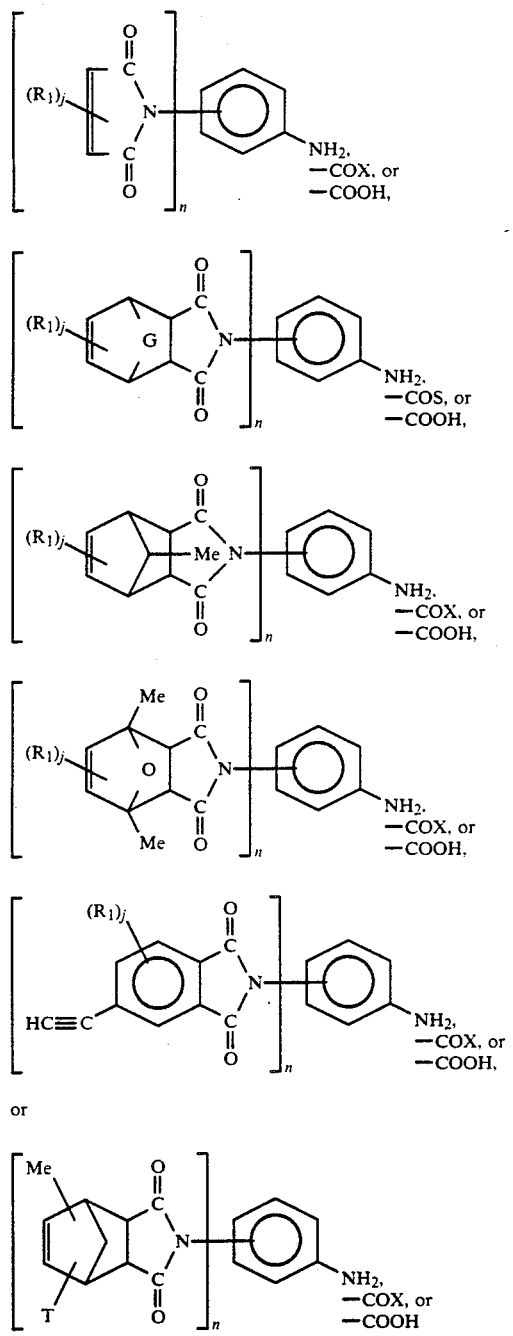

wherein
n = 1 or 2;
R₁ = lower alkyl, lower alkoxy, aryl, substituted aryl, substituted alkyl, aryloxy, or halogen;
G = —CH₂—, —S—, —O—, or —SO₂— (preferably —CH₂—);
j = 0, 1, or 2;
T = allyl or methallyl; and
Me = methyl. Other maleic, dimethyl oxynadic, ethynyl, trimethylsilylethynl, and phenylethynyl end groups may also be used, if desired, to allow curing at lower temperatures and to produce composites of lower thermal stability.

These end cap monomers are readily prepared from the corresponding anhydrides, as explained in U.S. Pat. No. 4,604,437. The phenylamine monomers can be prepared by reacting the corresponding acid halide monomer with ammonia to form the acid amide, and rearranging the acid amide to the amine.

To obtain the highest thermal stability, the preferred end caps are:

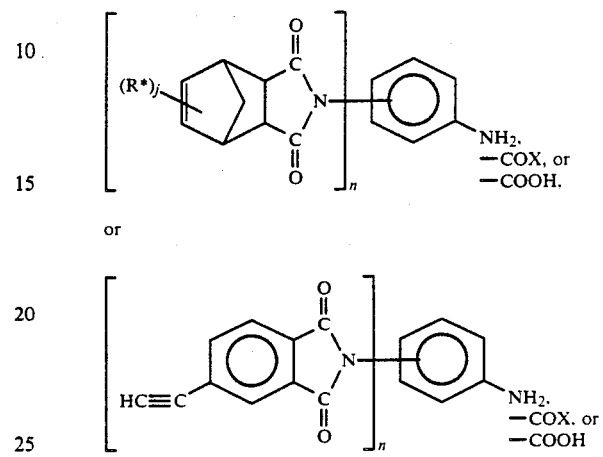

wherein
R* = methyl;
n = 1 or 2 (preferably 2); and
j = 0, 1, or 2 (preferably 1).

The oligomers of the present invention generally exhibit greater oxidative stability and greater dimensional stability at elevated temperatures, greater impact strengths, greater dimensional stiffness over a wider range of temperatures, and greater toughness than prior art conductive oligomers and composites.

Dopants for creating semiconductive or conductive composites with "Schiff base" oligomers are preferably selected from compounds commonly used to dope other polymers, namely, (1) dispersions of alkali metals (for high activity) or (2) strong chemical oxidizers, particularly alkali perchlorates (for lower activity). Arsenic compounds and elemental halogens, while active dopants, are too dangerous for general usage, and are not recommended.

The dopants react with the oligomers or polymers to form charge transfer complexes. N-type semiconductors result from doping with alkali metal dispersions. P-type semiconductors result from doping with elemental iodine or perchlorates. Dopant should be added to the oligomer or blend prior to forming the prepreg.

While research into conductive or semiconductive polymers has been active, the resulting compounds (mainly polyacetylenes, polyphenylenes, and polyvinylacetylenes) are unsatisfactory for aerospace applications because the polymers are:

(a) unstable in air;
(b) unstable at high temperatures;
(c) brittle after doping;
(d) toxic because of the dopants; or
(e) intractable.

These problems are overcome or significantly reduced with the conductive oligomers of the present invention.

As used in describing the suitable diacid halides and diamines, "Schiff base" is used throughout this specification in a generic way rather than in its typical chemical way, and is used to represent as well other conductive linkages, such as —CH=N—, oxazoles, thiazoles, or imidazoles.

While conventinal theory holds that semiconductive polymers should have (1) low ionization potentials, (2) long conjugation lengths, and (3) planar backbones, there is an inherent trade-off between conductivity and toughness or processibility, if these constraints are followed. To overcome the processing and toughness shortcomings common with Schiff base, oxazole, imidazole, or thiazole polymers, the oligomers of the present invention, include "sulfone" linkages interspersed along the backbone providing a mechanical swivel for the rigid, conductive segments of the arms. Phenoxyphenylsulfone or phenoxyphenylketone moieties are preferred. The resulting compounds are polyphenoxyphenylsulfoneimido oligomers with conductive segments.

Thermally stable, conductive or semiconductive oligomers having the multidimensional morphology may also be synthesized. A typical compound has the structural formula:

or

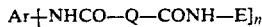

wherein
Ar = an aromatic moiety;
P = a linear polyaryl residue of a diamine, often including a "sulfone" linkage;
Q = a linear polyaryl residue of a diacid halide including a "Schiff base" linkage, as previously described; and
n = 3 or 4.

The multidimensional oligomers suitable for high temperature advanced composites generally are synthesized to include a high degree of aromatic groups. The stable aromatic bond energies allow synthesis of an oligomer having outstanding thermal stability. Acceptable toughness and impact resistance is gained (as with the linear oligomers) through electronegative linkages within the linear chains of aromatic groups that radiate from the central aromatic hub. The electronegative linkages ("sulfone" linkages) include the groups: —CO—; —SO$_2$—; —(CF$_3$)$_2$C—; and —S—. Generally, —CO— and —SO$_2$— groups are preferred for cost, convenience, and performance. The group —S—S— should be avoided, since it is too thermally labile.

The preferred aromatic moieties are aryl groups, such as phenyl, biphenyl, and naphthyl. Other aromatic groups can be used, if desired, since their stabilized aromatic bonds should provide the desired thermal stability. For example, azaline groups may be used. The aryl groups may include substituents, if desired, such as halogen, lower alkyl up to about 4 carbon atoms, lower alkoxy up to about 4 carbon atoms, or aryl side chains. Steric hindrance may arise in synthesizing the oligomers or in crosslinking the oligomers into cured composites, if the side chains are too large. The substituents may also effect the thermal stability of the resulting oligomers and composites. Unsubstituted phenyl groups are preferred for cost, convenience, and performance.

In the multidimensional oligomers, an aromatic hub includes a plurality of rays or spokes radiating from the hub in the nature of a star to provide multidimensional crosslinking through suitable terminal groups with a greater number (i.e. higher density) of crosslinking bonds than linear arrays provide. Usually the hub will have three radiating chains to form a "Y" pattern. In some cases, four chains may be used. Including more chains leads to steric hindrance as the hub is too small to accommodate the radiating chains. A trisubstituted phenyl hub is highly preferred with the chains being symmetrically placed about the hub. Biphenyl, naphthyl, or azaline (e.g., melamine) may also be used as the hub radical along with other aromatic moieties, if desired.

Triazine derivatives can be used as the hub. These derivatives are described in U.S. Pat. No. 4,574,154 and have the general formula:

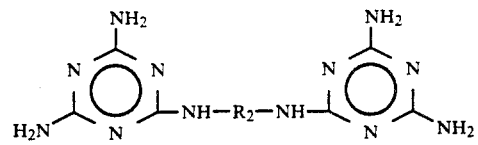

wherein R$_2$ is a divalent hydrocarbon residue containing 1-12 carbon atoms (and, preferably, ethylene).

Yet another class of hubs (aryletheramines) can be formed by reacting the corresponding halo-hub (such as tribromobenzene) with aminophenol to form triamine compounds represented by the formula:

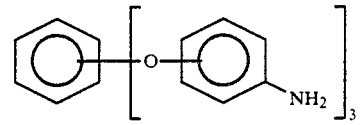

The best results are likely to occur when the arm length is as short as possible and the oligomer has six crosslinking sites. The most preferred hub includes the phenyl radical, since these compounds are relatively inexpensive, are more readily obtained, and provide oligomers with high thermal stability.

The chains of the oligomers include crosslinking end groups which improve the solvent-resistance of the cured composites. These end groups may be thermally or chemically activated during the curing step to provide a strongly crosslinked, complex, multidimensional array of interconnected oligomers. When the goal is an advanced composite having a glass transition temperature above 900° F. (and preferably above 950° F.) each end cap should have high thermal stability and a high thermal activation temperature. End caps with two crosslinking functionalities (difunctional end caps) are expected to yield the highest crosslinked arrays.

Although the para isomer is illustrated, other isomers may be used. The highest thermal stabilities appear to be achievable with unsubstituted phenyl chains of short length (i.e., low molecular weight), when these chains are capped with difunctional end caps. The meta- isomer may be preferred, since it tends to create a ribbon structure in the backbone.

The oligomers may be formed by the attachment of arms to the hub followed by chain extension and chain termination. For example, trihydroxybenzene may be mixed with p-aminophenol and 4,4'-dibromodiphenylsulfone and reacted under an inert atmosphere at an elevated temperature to achieve an amino-terminated "star" of the general formula:

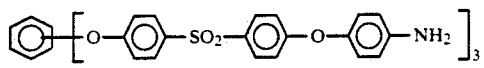

that can be reacted with suitable diacid halides and/or end caps to yield a polyamide oligomer.

The oligomers can be synthesized in a homogeneous reaction scheme wherein all the reactants are mixed at one time, or in a stepwise reaction scheme wherein the radiating chains are affixed to the hub and the product of the first reaction is subsequently reacted with the end cap groups. Of course, the hub may be reacted with end-capped arms that include one reactive, terminal functionality for linking the arm to the hub. Homogeneous reaction is preferred, resulting undoubtedly in a mixture of oligomers because of the complexity of the reactions. The products of the processes (even without distillation or isolation of individual species) are preferred oligomer mixtures which can be used without further separation to form the desired advanced composites.

Linear or multidimensional oligomers can be synthesized from a mixture of four or more reactants so that extended chains may be formed. Adding components, however, adds to the complexity of the reaction and of its control. Undersirable competitive reactions may result or complex mixtures of macromolecules having widely different properties may be formed, because the chain extenders and chain terminators are mixed, and compete with one another.

Because the oligomers (resins) synthesized in accordance with this invention generally have appreciable molecular weight between the reactive (crosslinking) groups, the oligomers will retain sufficient plasticity to be processible during fabrication prior to crosslinking of the end caps to thermoset composites. If possible, thermoplastic formulations with even higher molecular weights should be synthesized. The resins preferably have MWs (average formula weights) between about 5000–40,000, and, more preferably, between about 15,000–25,000.

Solubility of the oligomers becomes an increasing problem as chain length increases. Therefore, shorter chains are preferred, if the resulting oligomers remain processible. That is, the chains should be long enough to yield thermoplastic characteristics to the oligomers but short enough to keep the oligomers soluble during the reaction sequence.

Blends can improve impact resistance of composites prepared from the crosslinkable oligomers without causing a significant loss of solvent resistance. The blends comprise mixtures of the crosslinkable oligomers and a comparable polymer that is incapable of crosslinking, and generally substantially equimolar amounts of the polymer and oligomers. For example, a crosslinkable oligomer can be synthesized by condensing:

(a) 2 moles of an imidophenylamine end cap;
(b) n moles of a suitable diamine; and
(c) n+1 moles of a suitable diacid halide in a suitable solvent under an inert atmosphere. The corresponding, comparable polymer can be synthesized by condensing:
(a) 2 moles of aniline;
(b) n moles of the diamine used in the crosslinkable oligomer; and
(c) n+1 moles of the diacid halide used in the crosslinkable oligomer in a suitable solvent under an inert atmosphere. Aniline quenches the polymerization, while the diamine and diacid halide react to form the same backbone as contained in the crosslinkable oligomer. The crosslinkable oligomer and comparable polymer can, then, be blended together by mixing mutually soluble solutions of each. While the blend is preferably equimolar in the oligomer and polymer, the ratio of the oligomer and polymer can be adjusted to achieve the desired physical properties.

Although the polymer in the blend usually has the same length backbone as the oligomer, the properties of the composite formed from the blend can be adjusted by altering the ratio of formula weights for the polymer and oligomer. It is probably nonessential that the oligomer and polymer have identical repeating units, but that the oligomer and polymer merely be compatible in the solution prior to sweeping out as a prepreg. Of course, if the polymer and oligomer have identical backbones, compatibility in the blend is likely to occur.

Other quenching compounds can be employed, if desired, since the function of the quenching compounds is merely to regulate the polymerization of the comparable polymer so that it has an average formula weight substantially identical with the crosslinkable oligomer. For thermal stability, an aromatic quenching compound is preferred.

Solvent resistance may decrease markedly if the comparable polymer is provided in large excess to the crosslinkable oligomer in the blend.

The polyamide oligomers can also be prepared by the condensation of diacid halides, diamines, and crosslinking end cap anhydrides of the formula:

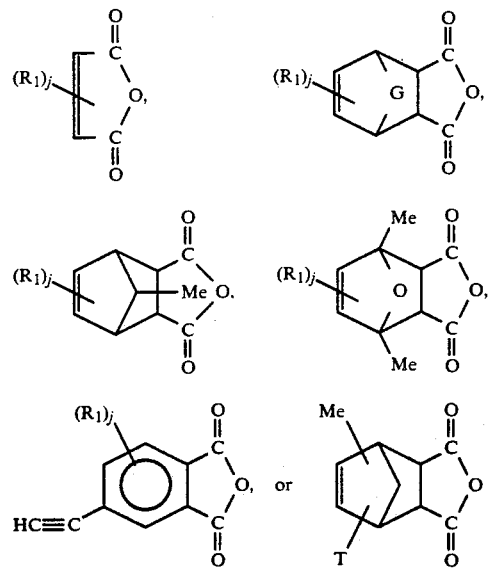

in the ratio of n:(n+1):2 moles of the respective reactants.

Oligomers made with this synthetic scheme include those of the formulae:

E=N—Z$\left[\right.$NHCO—Q—CONH—Z$\left.\right]_{\overline{m}}$N=E;

Ar—$\left[\right.$CONH—Z—N=E$\left.\right]_n$;

Ar—$\left[\right.$CONH—Z—NHCO—Q$\left.\right]_{\overline{m}}$CONH—Z—N=E$\left.\right]_n$;

Ar—$\left[\right.$NHCO—Q—CONH—Z$\left.\right]_{\overline{m}}$N=E$\left.\right]_n$ wherein E=a residue of the above identified anhydrides, and P and Q as previously described.

The present invention also addresses novel imidophenylamine end cap monomers of the formula:

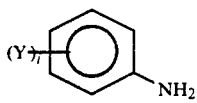

wherein Y is selected from the group consisting of:

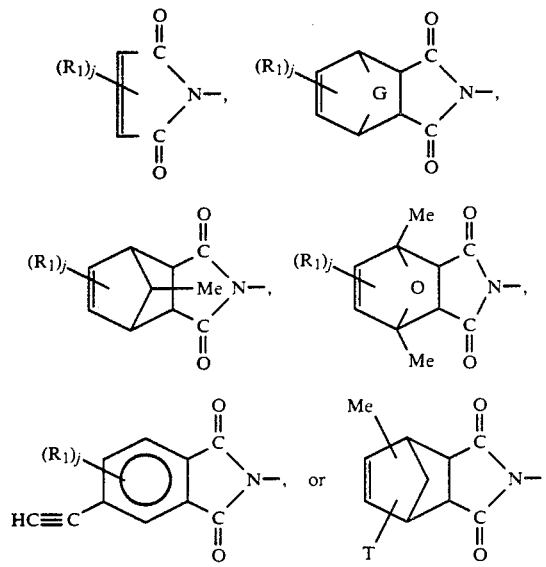

wherein
$R_1$ = lower alkyl, lower alkoxy, aryl, aryloxy, substituted aryl, substituted alkyl, halogen, or mixtures thereof;
j = 0, 1 or 2;
i = 1 or 2;
Me = methyl;
G = —CH$_2$—, —O—, —S—, or —SO$_2$—; and
T = allyl or methallyl, as previously described.

These phenylamines compounds are prepared by reacting a corresponding acid halide (chloride) end cap with ammonia to form an acid amide, and converting the acid amide to the amine.

Bis(phenoxy phenyl) ketone acids can be prepared by the condensation of two moles of cresol with:

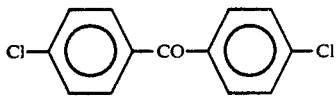

in DMSO with suitable NaOH (or another base) followed by oxidation of the terminal —CH$_3$ groups with KMnO$_4$ in pyridine at an elevated temperature to yield:

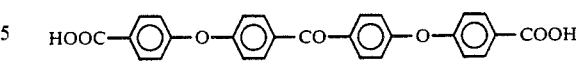

Alternatively, the ketone acids can be prepared by reacting:

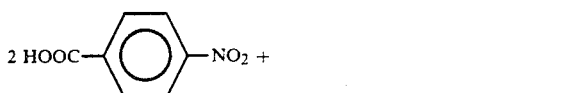

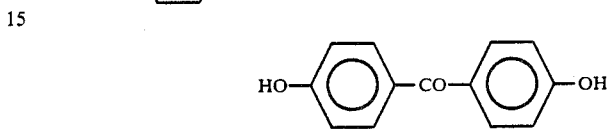

to yield:

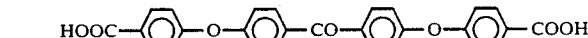

The carboxylic acids can be converted to the acid halide in SO$_2$Cl, as previously described.

As already discussed, prepregs and advanced composites can be readily prepared from the oligomers by conventional techniques. For example, the oligomers can be applied to a fiber cloth reinforcement, and the resulting prepreg can be cured in a conventional vacuum bag process at an elevated temperature. The dopant should be added to the oligomer prior to prepreging, if conductive or semiconductive composites are being prepared.

While woven fabrics are the typical reinforcement in prepregs, the reinforcing fibers can be continuous or discontinuous (in chopped or whisker form) and may be ceramic, organic, carbon (graphite), or glass, as suited for the desired application.

The oligomers and blends can also be used as adhesives, varnishes, films, or coatings.

EXAMPLE 1

Synthesis of

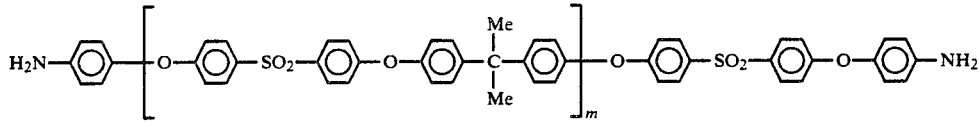

wherein m has an average value greater than 1. (Average Molecular Weight 5000).

In a 1 liter flask fitted with a stirrer, thermometer, Barrett trap, condenser, and N$_2$ inlet tube, 8.04 g (0.074 moles) p-aminophenol, 86.97 g (0.38 moles) bisphenol A, 281,22 g dimethylsulfoxide (DMSO), and 167.40 g toluene were mixed and stirred. After purging with dry nitrogen, 67.20 g of a 50% solution of sodium hydroxide was added, and the temperature was raised to 110°–120° C. The water was removed from the toluene azeotrope, and then the toluene, until the temperature reached 160° C. The reaction mixture was cooled to 110° C., and 120 g (0.42 moles) 4,4'-dichlorodiphenylsulfone as a solid was added. The mixture was reheated to 160° C. and held there for 2 hours. After cooling to room temperature, the mixture was filtered to remove sodium chloride, which precipitated, and the product was coagulated in a blender from a 2% sodium hydroxide solution containing 1% sodium sulfite. The oligomer was recovered from the solution by washing the coagulate with 1% sodium sulfite.

EXAMPLE 2

Synthesis of the oligomer of Example 1 but with an Average Formula Weight 2,000.

A one liter flask was fitted with a stirrer, thermometer, Barrett trap, condenser, and N₂ inlet tube and charged with 10.91 g (0.1 moles) of p-aminophenol, 40.43 g (0.18 moles) bisphenol A, 168,6 g DMSO, and 79.23 g toluene. After purging with nitrogen, 36.42 g of a 50% solution of sodium hydroxide was added, and the temperature was raised to 110°-120° C. to remove the water from the toluene azeotrope, and then to distill off the toluene until the temperature reached 160° C. The reaction mixture was cooled to 110° C., and 65.22 g (0.23 moles) 4,4'-dichlorodiphenylsulfone as a solid was added. The mixture was heated to 160° C. and held there for 2 hours. After cooling to room temperature, the mixture was filtered to remove sodium chloride. A coagulate was formed in a blender by adding 2% sodium hydroxide solution containing 1% sodium sulfite. The coagulate was removed and washed with 1% sodium sulfite.

EXAMPLE 3

Synthesis of a diamine of Example 1 having an Average Formula Weight of 10,000.

The procedure followed in Example 1 was used, except that 2.18 g (0.02 moles) of p-aminophenol, 49.36 g (0.216 moles) of bisphenol A, 64.96 g (0.226 moles) of 4,4'-dichlorodiphenylsulfone were used.

HYPOTHETICAL EXAMPLES

EXAMPLE 4

A linear, difunctional oligomer is prepared by reacting 2 moles of the diamine of Example 1 with one mole of:

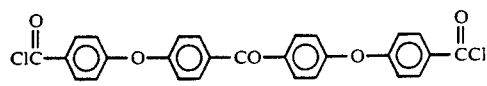

and 2 moles of

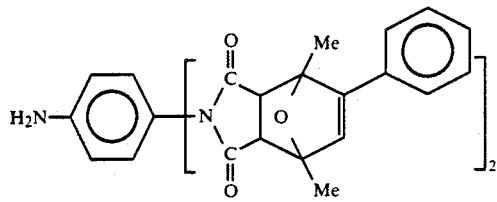

to yield a polyamide oligomer having alternating ether linkages and two dioxymethylnadic crosslinking end caps.

EXAMPLE 5

A multidimensional oligomer is prepared by reacting:

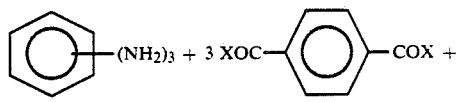

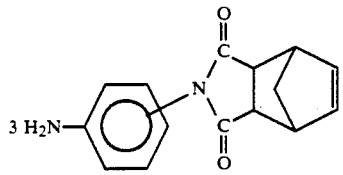

under an inert atmosphere to yield:

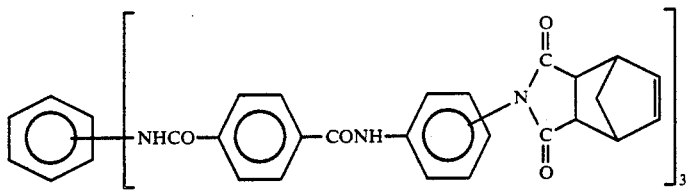

Oligomers of this general type are preferred because the starting materials are easily obtained and are relatively inexpensive.

EXAMPLE 6

A difunctional crosslinking, multidimensional oligomer is prepared by reacting:

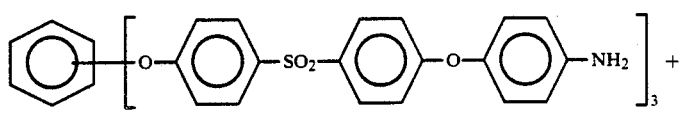

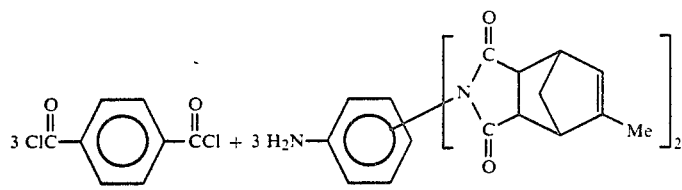
under an inert atmosphere to yield:
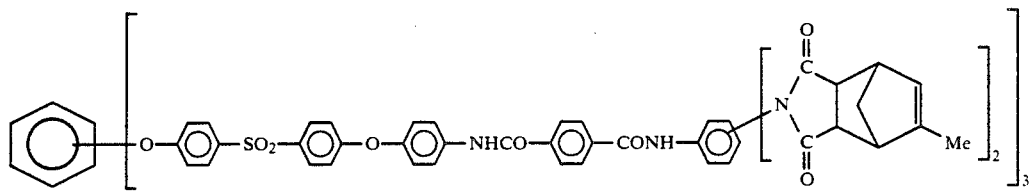
EXAMPLE 7
Another preferred multidimensional oligomer is prepared by reacting:
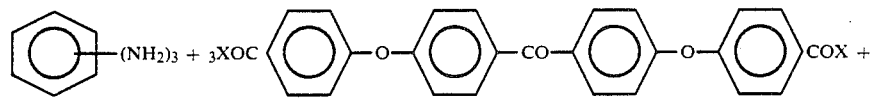
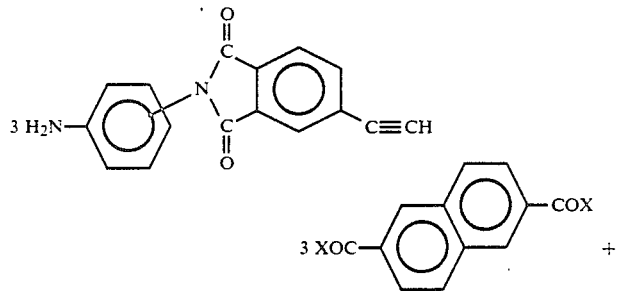
under an inert atmosphere to yield:
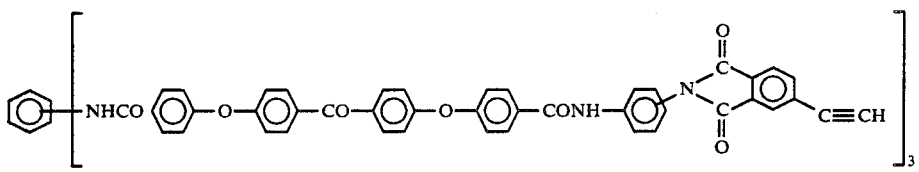
wherein q = —$SO_2$—, —CO—, —S—, or —$(CF_3)_2C$—, and preferably —$SO_2$— or —CO—.
EXAMPLE 8
A multidimensional oligomer is prepared by reacting:
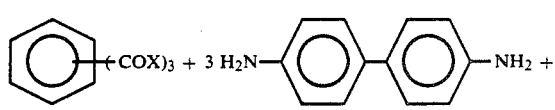
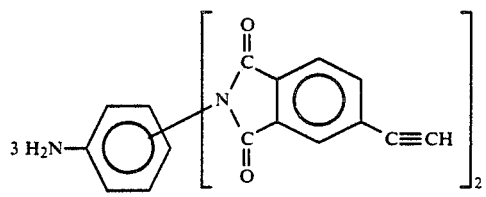
under an inert atmosphere to yield:

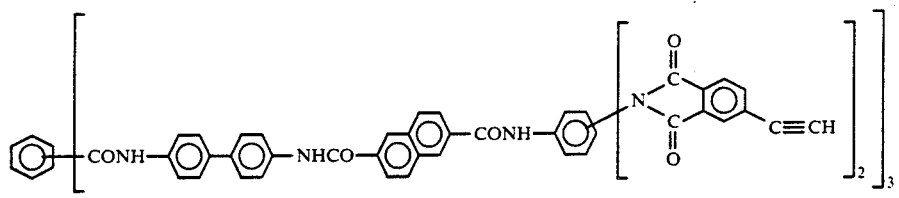

Competitive side reactions between the reactants in Example 8 will likely hinder the yield of this product and will make isolation of the product difficult. Yield can be enhanced by adding the reactants serially, but the physical properties of the resulting oligomers might be impaired.

EXAMPLE 9

Yet another multidimensional oligomer is prepared by reacting:

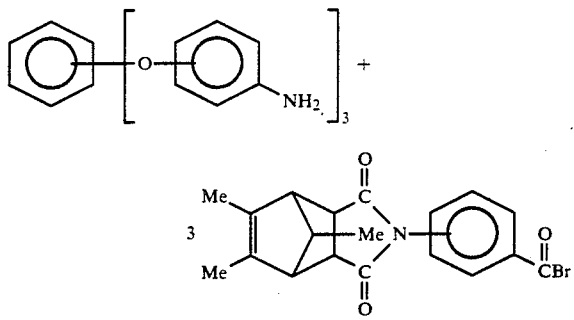

under an inert atmosphere to yield:

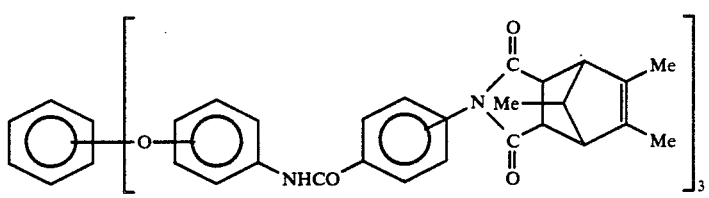

EXAMPLE 10

A blend and prepreg from the blend are prepared by synthesizing the oligomer of Example 4 and a comparable, noncrosslinking polymer by reacting:

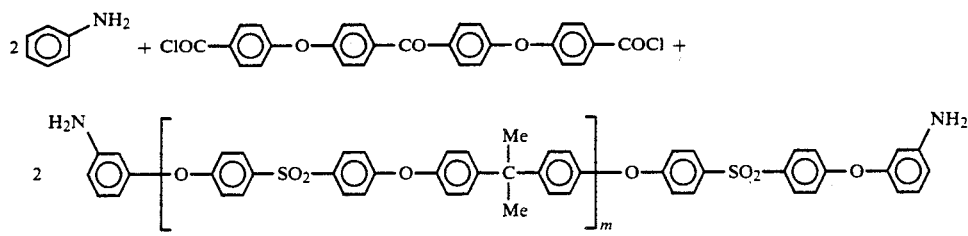

under an inert atmosphere in a suitable solvent. The oligomer of Example 4, dissolved in the same solvent, is added to the polymer solution to form an equimolar mixture of the oligomer and polymer and the resulting polymer/oligomer lacquer is stirred. A prepreg is prepared by sweeping the polymer/oligomer lacquer into a graphite fabric by solvent impregnation. The fabric is spread on a release film of FEP, and the blend is infiltrated into the fabric by sweeping the lacquer into the fabric, drying the fabric, turning the fabric, and repeating the steps until the prepreg contained about 35–50 wt. % resin solids. Thereafter the prepreg is dried at an elevated temperature in an air-circulating oven.

EXAMPLE 11

An oligomer that can be mixed with a suitable dopant and cured to a semiconductive composite is prepared by reacting:

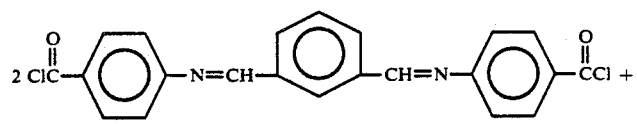

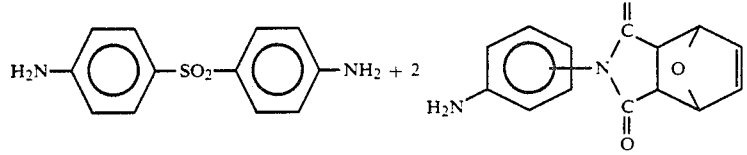 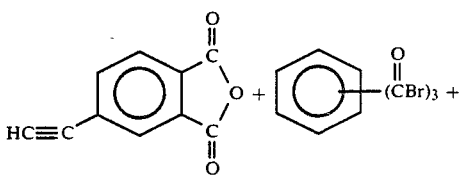

under an inert atmosphere to yield a linear polyamide oligomer with Schiff base segments and oxynadic crosslinking end caps.

EXAMPLE 12

A multidimensional oligomer is prepared by reacting:

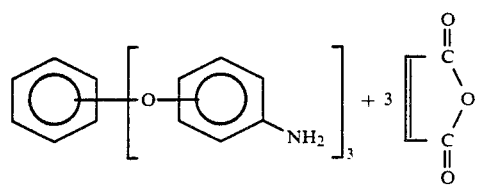

under an inert atmosphere to yield:

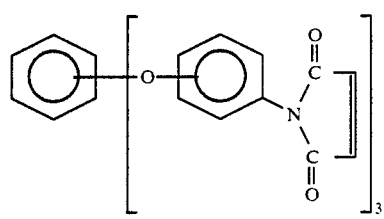

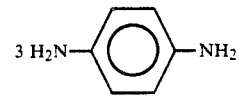

under an inert atmosphere to yield:

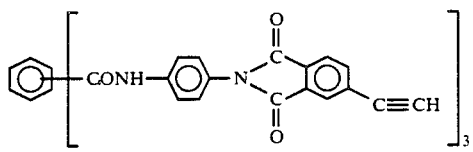

EXAMPLE 15

A multidimensional oligomer is prepared by reacting melamine with nadic anhydride to yield:

EXAMPLE 13

A polyamide oligomer is prepared by reacting:

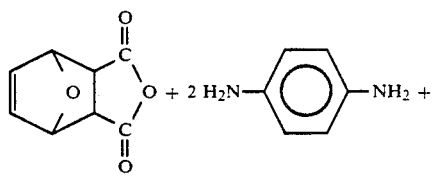

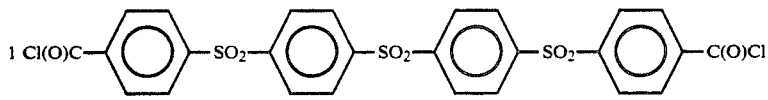

under an inert atmosphere to yield:

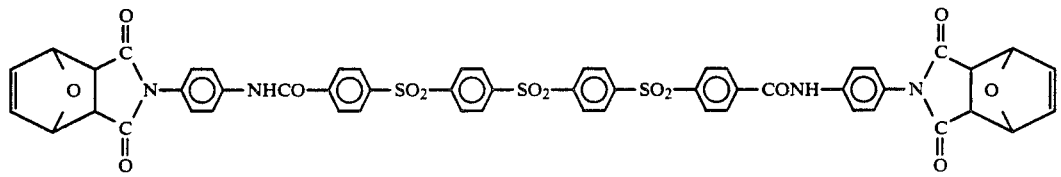

EXAMPLE 14

A multidimensional, polyamide oligomer is prepared by reacting:

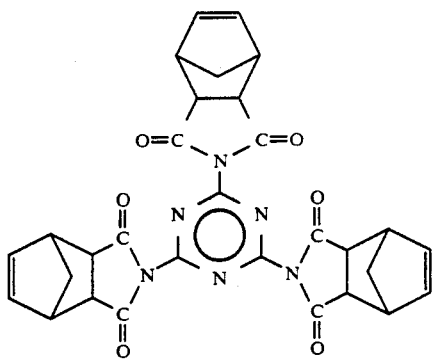

EXAMPLE 16

A multidimensional, polyamide oligomer is prepared by reacting about 1 mole of melamine with about 3 moles of

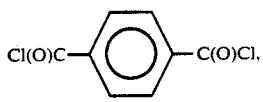

about 3 moles of phenylenediamine, and about 3 moles of nadic anhydride to yield primarily:

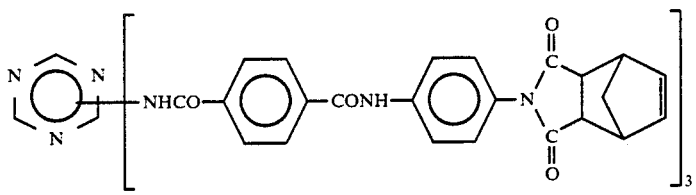

EXAMPLE 17

A multidimensional, polyamide oligomer is prepared by reacting about 1 mole of

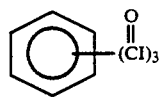

with about 3 moles of phenylenediamine and about 3 moles of

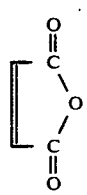

to yield primarily:

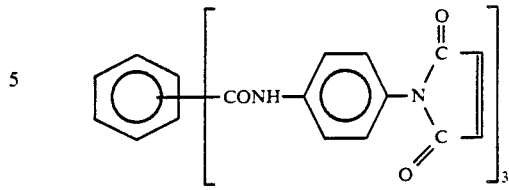

Better yield might be obtained by reacting the anhydride with aminobenzoic acid and converting the —COOH functionality to an amine followed by condensation of the monofunctional amine cap with the acid halide hub.

Those skilled in the art will recognize the generality of the reaction schemes in the production of polyamide advanced composites.

While preferred embodiments have been described, those skilled in the art will readily recognize alterations, variations, and modifications which might be made without departing from the inventive concept. Therefore, the claims should be interpreted liberally with the support of the full range of equivalents known to those of ordinary skill based upon this description. The examples are given to illustrate the invention and not intended to limit it. Accordingly, the claims should only be limited as is necessary in view of the pertinent prior art.

We claim:

1. A polyamide oligomer having the general formula:

$$E=N-Z+NHCO-Q-COHN-Z\overline{)_m}N=E$$

formed by the condensation of a mixture of a diacid halide, a diamine, and a cross-linking end cap monoanhydride, wherein Z is the residue of the diamine;
Q is the residue of the diacid halide;
E is a divalent residue of the monoanhydride; and
m is a small integer greater than or equal to 1.

2. The oligomer of claim 1 wherein the monoanhydride is selected from the group consisting of:

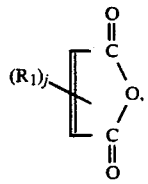 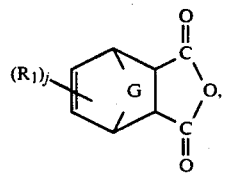

-continued

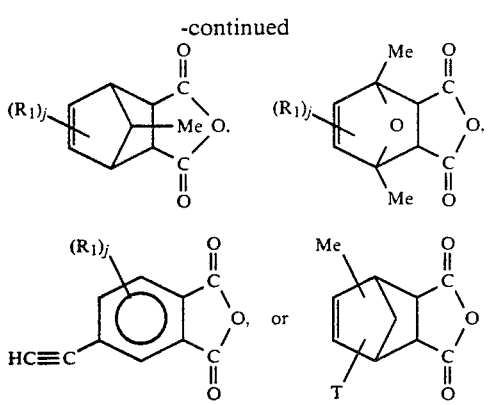

wherein:
R1 is lower alkyl, lower alkoxy, aryl, aryloxy, substituted alkyl, substituted aryl, halogen, or mixtures thereof;
j=0, 1, or 2;
Me is methyl;
G is —CH$_2$—, —O—, —S—, or —SO$_2$—; and
T is allyl or methallyl.

3. A method for synthesizing a polyamide oligomer comprising the step of:
condensing a mixture having a molar ratio of substantially about:
(a) 2 moles of a cross-linking end cap monoanhydride,
(b) n+1 moles of a diamine, and
(c) n moles of a diacid halide.
wherein n=and integer greater than or equal to 1.

4. A multidimensional, polyamide oligomer having a general formula:

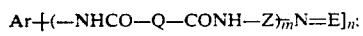

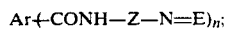

or

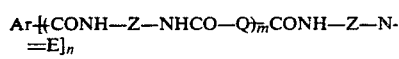

formed by the condensation of a mixture of an aromatic amine or aromatic acid halide, a diacid halide, a diamine, and a cross-linking end cap monoanhydride, wherein
Ar is an aromatic moiety;

n is 3 or 4;
Z is a linear organic residue of the diamine;
Q is a linear organic residue of the diacid halide;
E is a divalent residue of the monoanhydride; and
m is a small integer greater than or equal to 1.

5. The oligomer of claim 1 wherein the diacid halide includes a radical selected from the group consisting of: phenyl, naphthyl, biphenyl; a divalent radical of the general formula:

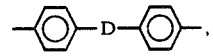

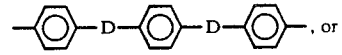

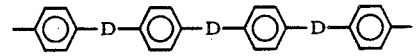

wherein D=—S—, —O—, —CO—, —SO$_2$—, —(CH$_3$)$_2$C—, —(CF$_3$)$_2$C—; a divalent radical compound having at least one conductive linkage selected from the group consisting of Schiff base, thiazole, oxazole, or imidizole linkages; or a divalent radical of the general formula:

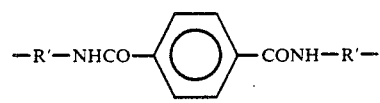

wherein R'=a C$_2$ to C$_{12}$ divalent aliphatic, alicyclic, or aromatic radical.

6. The oligomer of claim 5 wherein the conductive linkage is a Schiff base selected from the group consisting of:

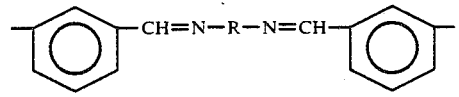

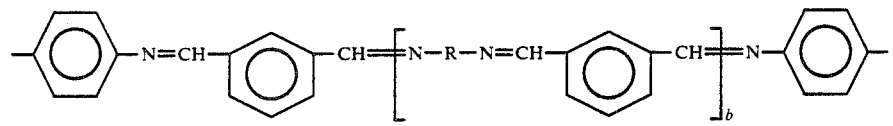

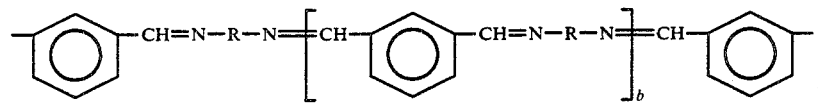

wherein R is a radical selected from the group consisting of phenyl, biphenyl, naphthyl, or a divalent radical of the general formula:

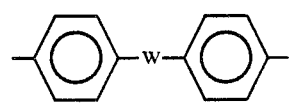

wherein W=—SO$_2$— or —CH$_2$—; and b=0-4.

7. The oligomer of claim 5 wherein the diamine is selected from the group consisting of:

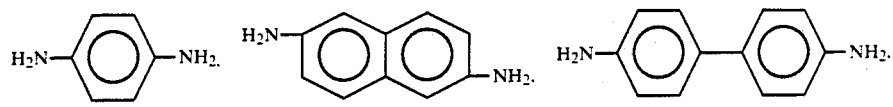
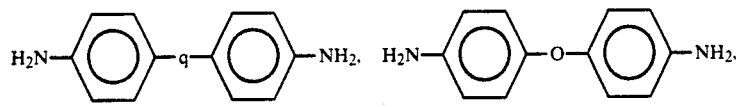
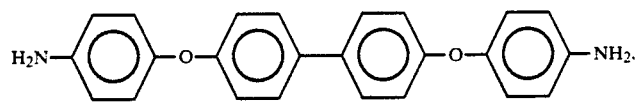
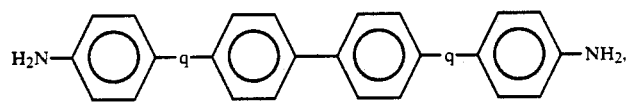
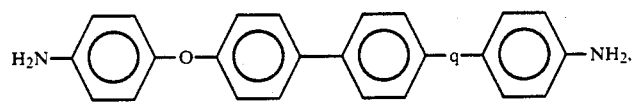
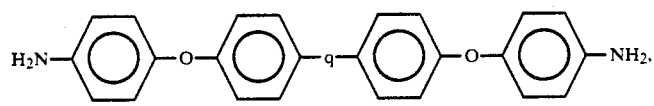
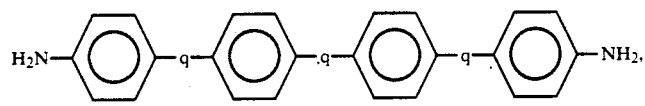
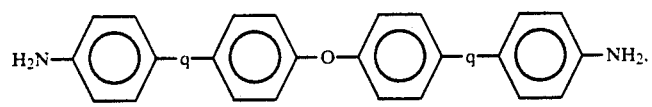
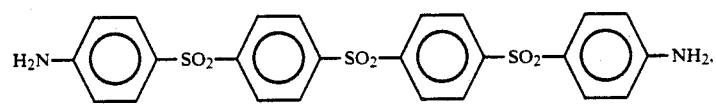
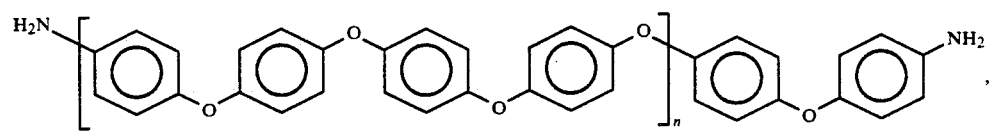
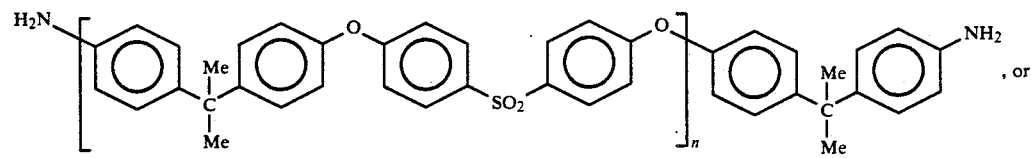, or
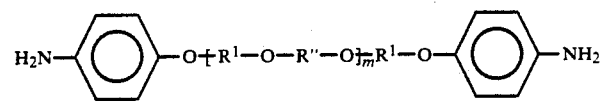
wherein
$R^1 =$

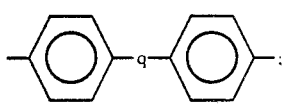

R″=

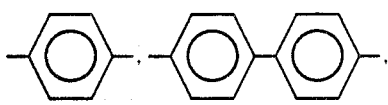

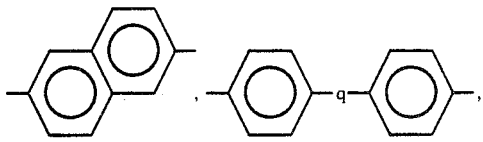

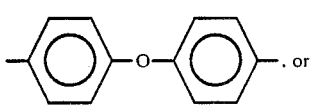, or

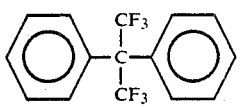

q=—SO₂—, —CO—, —S—, or —(CF₃)₂C—;
Me=methyl;
m=a small integer; and
D=—CO—, —SO₂—, —(CF₃)₂C— or mixtures thereof 8. The oligomer of claim 7 wherein the monoanhydride is selected from the group consisting of:

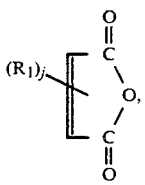

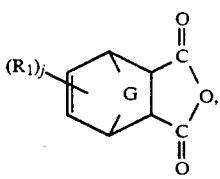

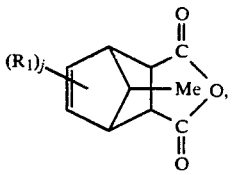

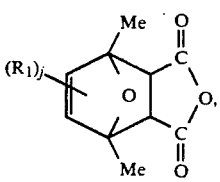

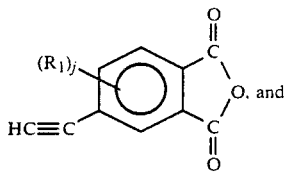

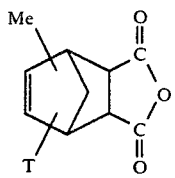

wherein
R₁=lower alkyl, lower alkoxy, aryl, aryloxy, substituted alkyl, substituted aryl, halogen, or mixtures thereof;
j=0, 1, or 2;
Me=methyl;
G=—CH₂—, —O—, —S—, or —SO₂—; and
T=allyl or methallyl.

9. The oligomer of claim 1 wherein the diacid halide is selected from the group consisting of:

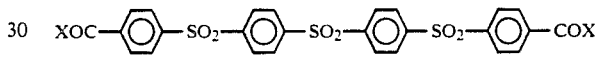

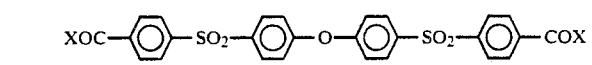

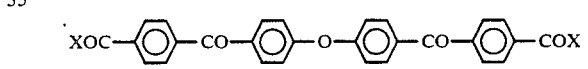

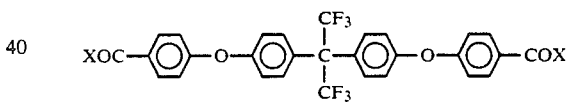

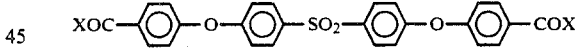

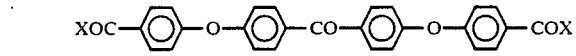

10. The oligomer of claim 9 wherein the monoanhydride is selected from the group consisting of:

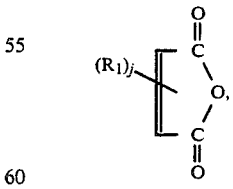

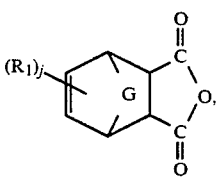

-continued
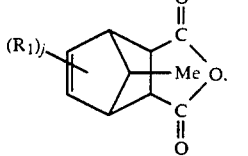
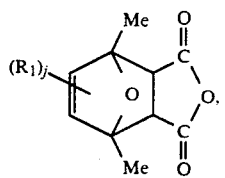
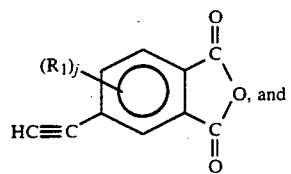
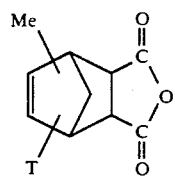
wherein
$R_1$ = lower alkyl, lower alkoxy, aryl, aryloxy, substituted alkyl, substituted aryl, halogen, or mixtures thereof;
j = 0, 1, or 2;
Me = methyl;
G = —$CH_2$—, —O—, —S—, or —$SO_2$—; and
T = allyl or methallyl.
11. The oligomer of claim 1 wherein the monoanhydride is selected from the group consisting of:
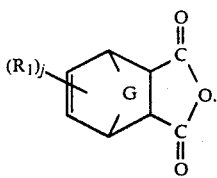
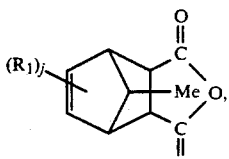
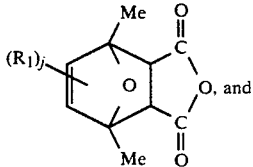
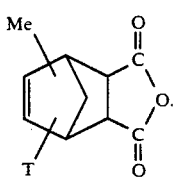
12. The oligomer of claim 1 wherein the diamine is selected from the group consisting of:
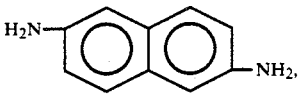
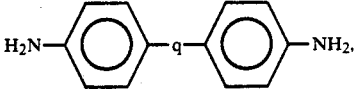
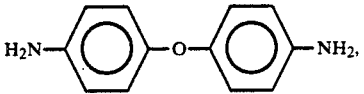

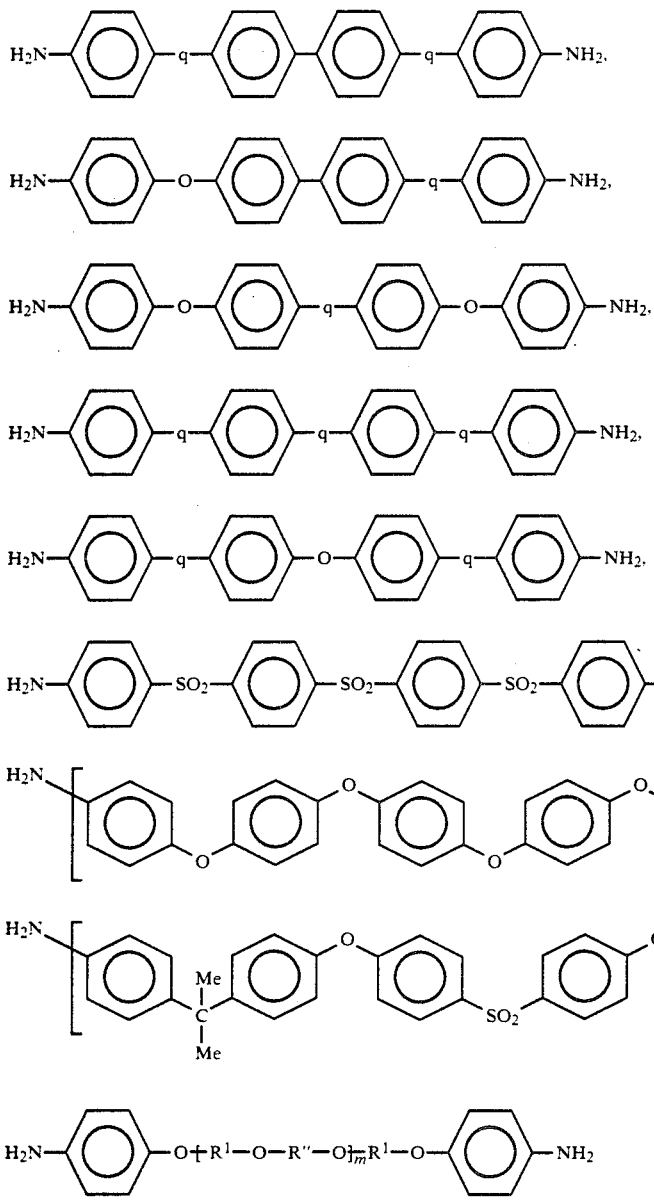
wherein
R¹ =
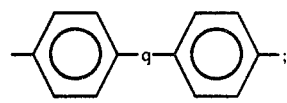
R″ =
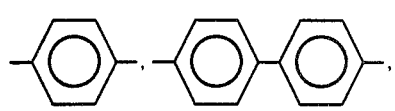
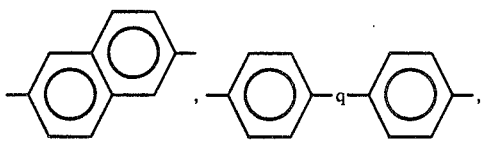
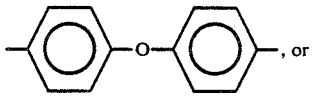
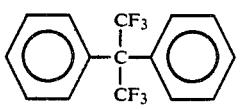
q = —SO₂—, —CO—, —S—, or —(CF₃)₂C—;
Me = methyl;

m = a small integer; and
D = —CO—, —SO₂—, —(CF₃)₂C— or mixtures thereof

13. The oligomer of claim 12 wherein q is —SO₂— or —CO—.

14. The oligomer of claim 12 wherein the monoanhydride is selected from the group consisting of:

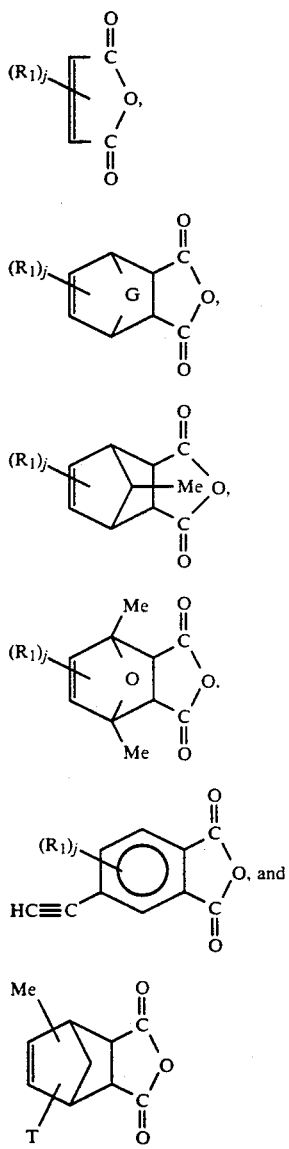

wherein
R₁ = lower alkyl, lower alkoxy, aryl, aryloxy, substituted alkyl, substituted aryl, halogen, or mixtures thereof;
j = 0, 1, or 2;
Me = methyl;
G = —CH₂—, —O—, —S—, or —SO₂—; and
T = allyl or methallyl.

15. The oligomer of claim 1 wherein the diacid halide is selected from the group consisting of:

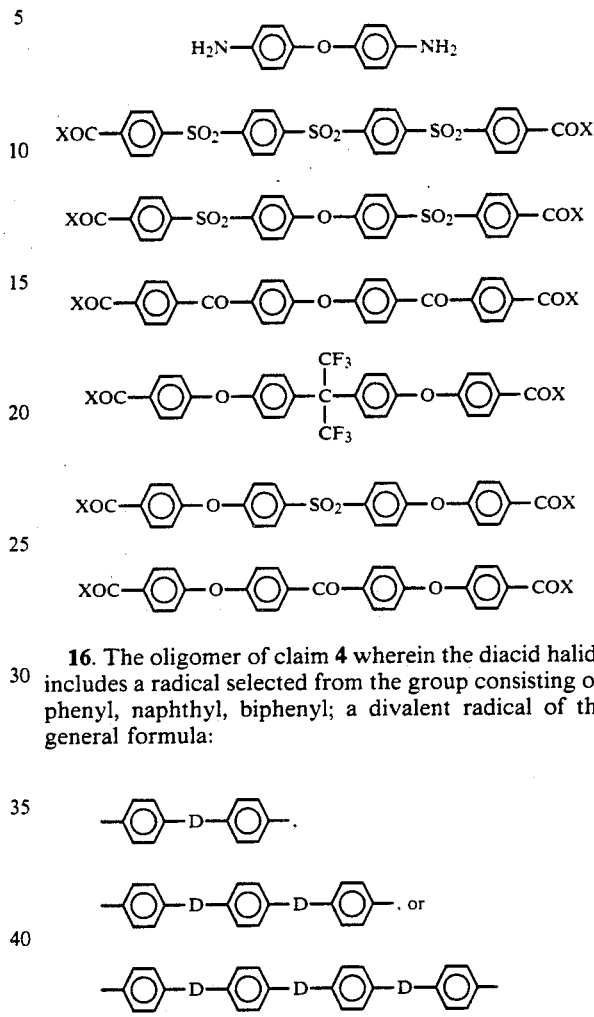

16. The oligomer of claim 4 wherein the diacid halide includes a radical selected from the group consisting of: phenyl, naphthyl, biphenyl; a divalent radical of the general formula:

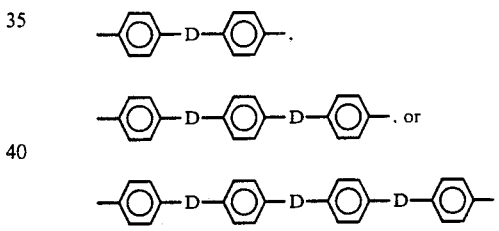

wherein D = —S—, —O—, —CO—, —SO₂—, —(CH₃)₂C—, —(CF₃)₂C—; a divalent radical compound having at least one conductive linkage selected from the group consisting of Schiff base, thiazole, oxazole, or imidizole linkages; or a divalent radical of the general formula:

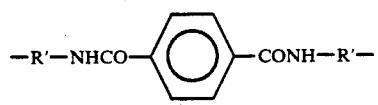

wherein R' = a C₂ to C₁₂ divalent aliphatic, alicyclic, or aromatic radical.

17. The oligomer of claim 16 wherein the conductive linkage is a Schiff base selected from the group consisting of:

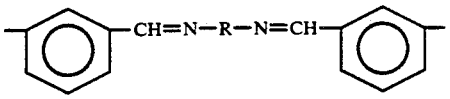

-continued
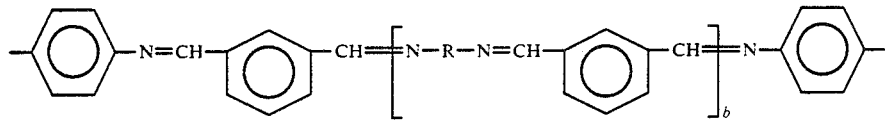
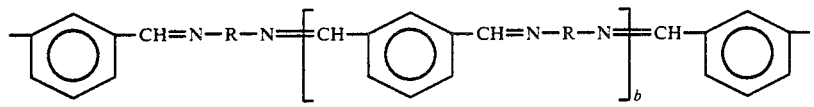
wherein R is a radical selected from the group consisting of phenyl; biphenyl; naphthyl; or a divalent radical of the general formula:
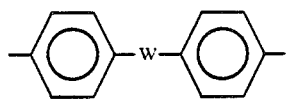
wherein W=—SO$_2$— or —CH$_2$—; and b=0-4.
18. The oligomer of claim 16 wherein the diamine is selected from the group consisting of:
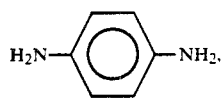
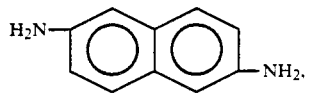
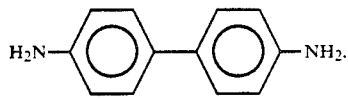
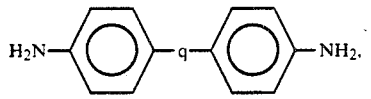
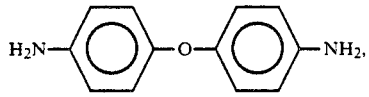
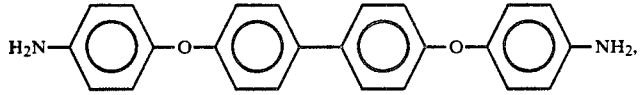
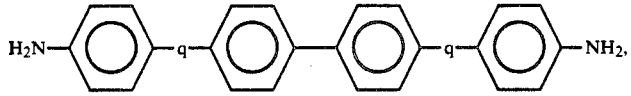
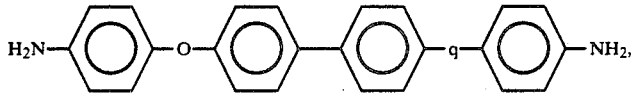
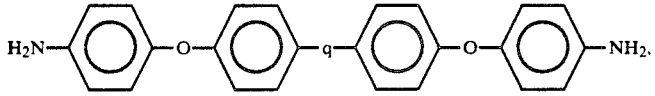

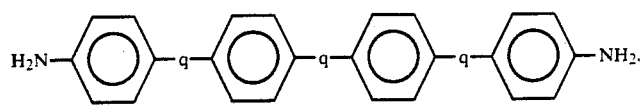
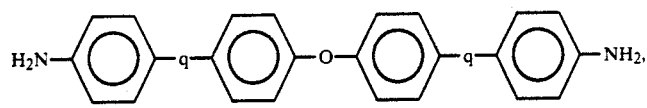
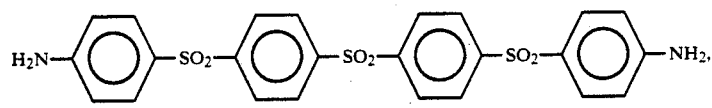
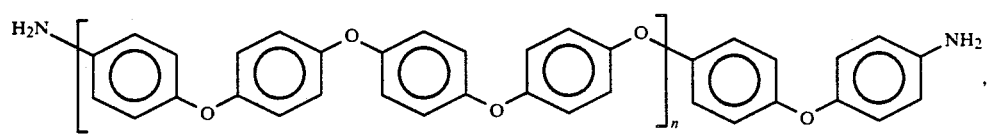
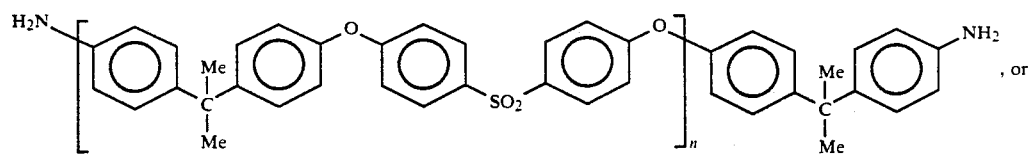
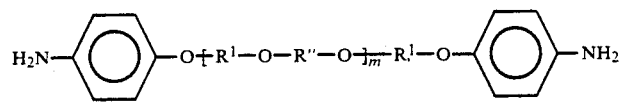
wherein
$R^1 =$
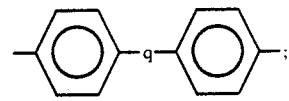
$R'' =$
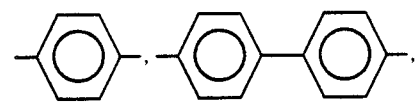
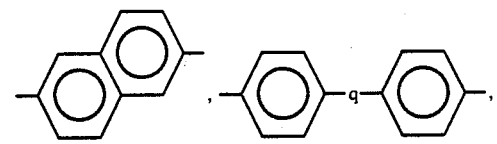
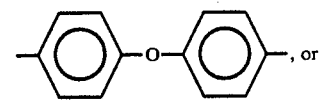
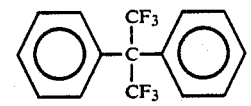
$q = -SO_2-$, $-CO-$, $-S-$, or $-(CF_3)_2C-$;
Me = methyl;
m = a small integer; and
D = $-CO-$, $-SO_2-$, $-(CF_3)_2C-$ or mixtures thereof
19. The oligomer of claim 18 wherein the monoanhydride is selected from the group consisting of:
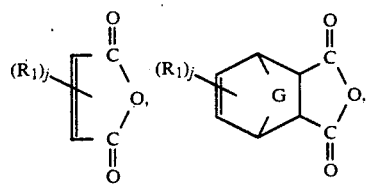
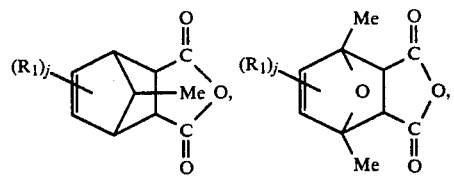
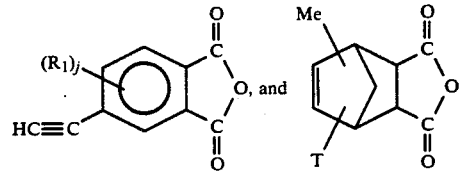
wherein
$R_1$ = lower alkyl, lower alkoxy, aryl, aryloxy, substituted alkyl, substituted aryl, halogen, or mixtures thereof;
j = 0, 1, or 2;

Me = methyl;
G = —CH₂—, —O—, —S—, or —SO₂—; and
T = allyl or methallyl.

20. The oligomer of claim 4 wherein the diacid halide is selected from the group consisting of:

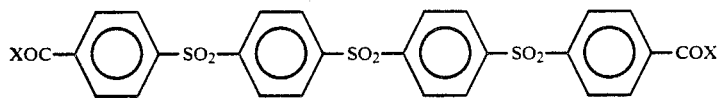

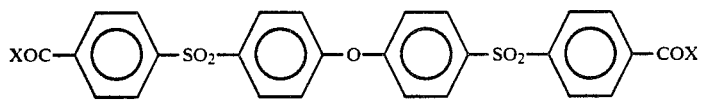

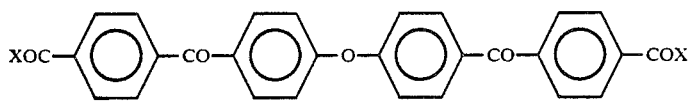

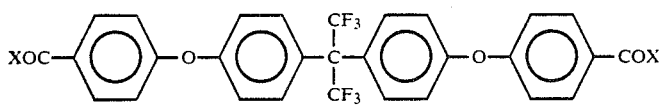

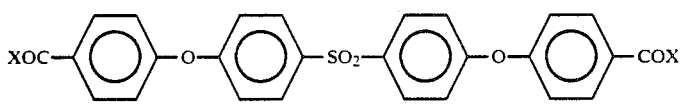

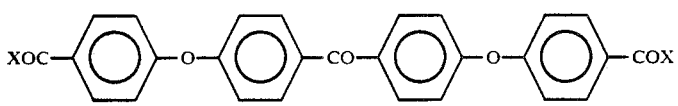

21. The oligomer of claim 20 wherein the monoanhydride is selected from the group consisting of:

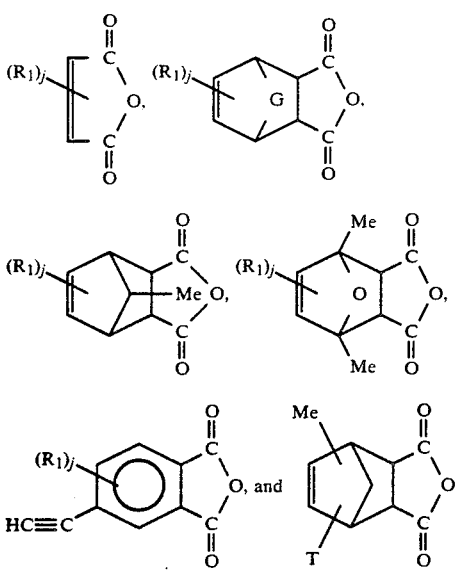

wherein
R₁ = lower alkyl, lower alkoxy, aryl, aryloxy, substituted alkyl, substituted aryl, halogen, or mixtures thereof;
j = 0, 1, or 2;

Me = methyl;
G = —CH₂—, —O—, —S—, or —SO₂—; and
T = allyl or methallyl.

22. The oligomer of claim 1 wherein the monoanhydride is selected from the group consisting of:

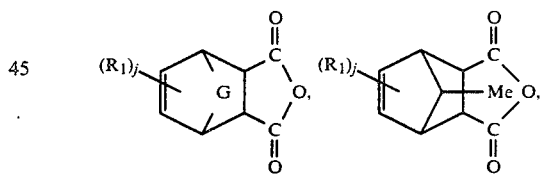

23. The oligomer of claim 1 wherein the diamine is selected from the group consisting of:

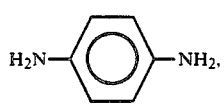

-continued
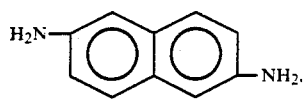
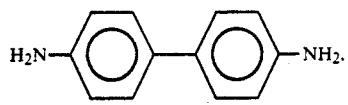
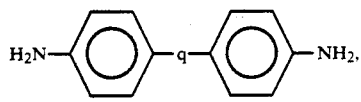
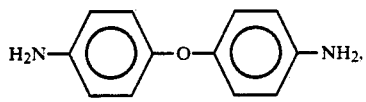
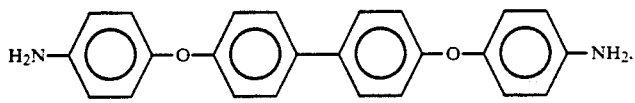
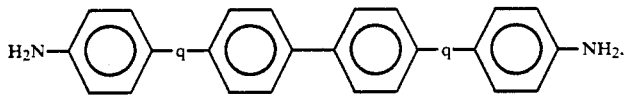
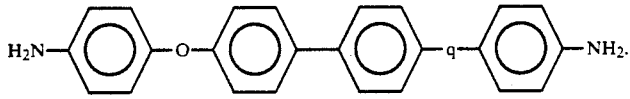
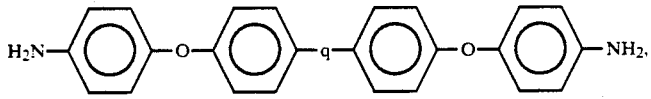
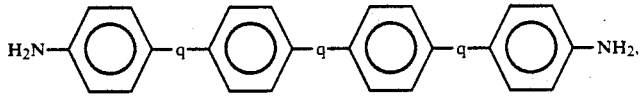
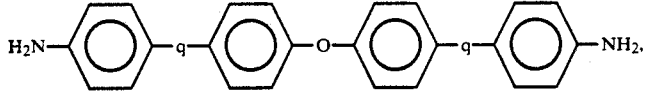
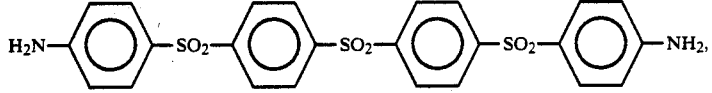
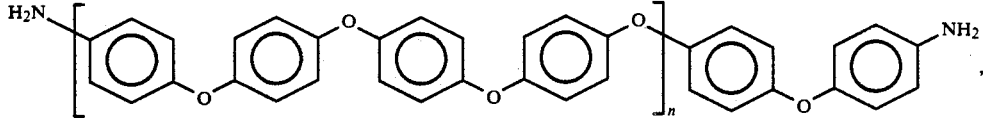
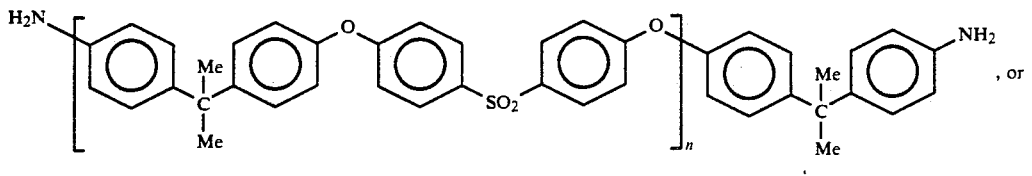

-continued

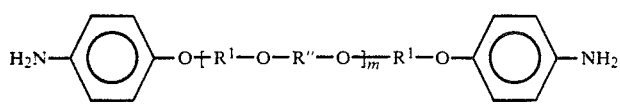

wherein
R¹=

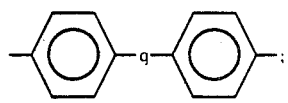

R''=

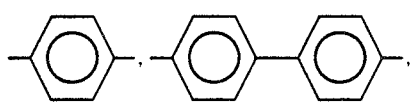

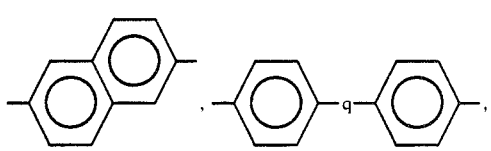

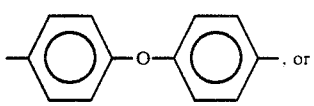

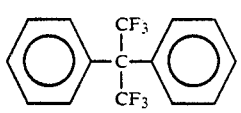

q = —SO₂—, —CO—, —S—, or —(CF₃)₂C—;
Me = methyl;
m = a small integer; and
D = —CO—, —SO₂—, —(CF₃)₂C— or mixtures thereof

24. The oligomer of claim 23 wherein q is —SO₂— or —CO—.

25. The oligomer of claim 23 wherein the monoanhydride is selected from the group consisting of:

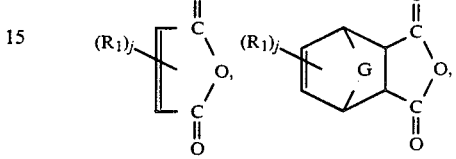

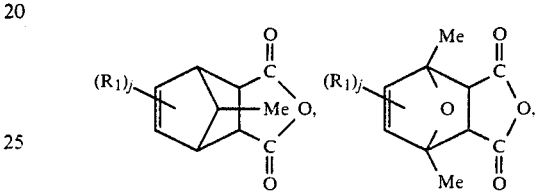

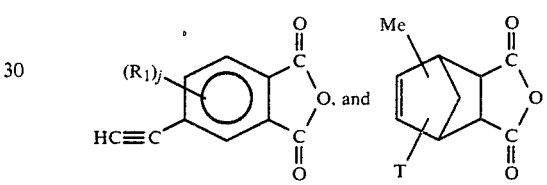

wherein
$R_1$ = lower alkyl, lower alkoxy, aryl, aryloxy, substituted alkyl, substituted aryl, halogen, or mixtures thereof;
j = 0, 1, or 2;
Me = methyl;
G = —CH₂—, —O—, —S—, or —SO₂—; and
T = allyl or methallyl.

26. The oligomer of claim 4 wherein the diacid halide is selected from the group consisting of:

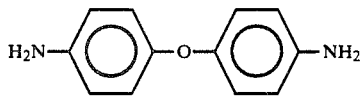

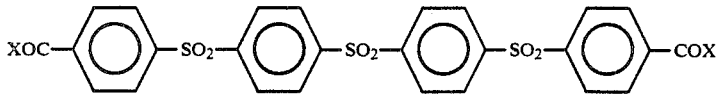

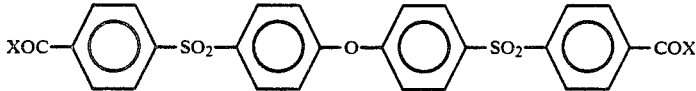

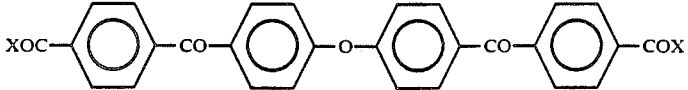

-continued
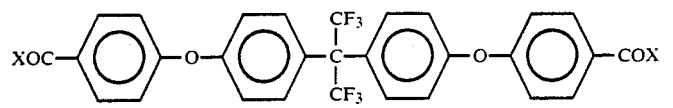
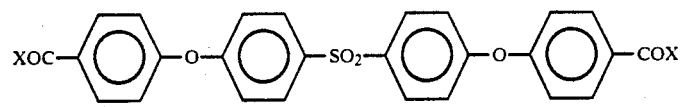
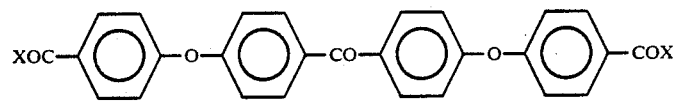
* * * * *